(12) United States Patent
Gaudio

(10) Patent No.: US 11,738,950 B2
(45) Date of Patent: Aug. 29, 2023

(54) PELVIC BRACES AND METHODS FOR USING SAME

(71) Applicant: Maria Gaudio, Woodstock, GA (US)

(72) Inventor: Maria Gaudio, Woodstock, GA (US)

( * ) Notice: Subject to any disclaimer, the term of this patent is extended or adjusted under 35 U.S.C. 154(b) by 0 days.

(21) Appl. No.: 17/329,416

(22) Filed: May 25, 2021

(65) Prior Publication Data

US 2022/0009716 A1    Jan. 13, 2022

Related U.S. Application Data

(63) Continuation of application No. 16/434,899, filed on Jun. 7, 2019, now Pat. No. 11,053,077.

(60) Provisional application No. 62/682,325, filed on Jun. 8, 2018.

(51) Int. Cl.
*B65G 7/12*    (2006.01)

(52) U.S. Cl.
CPC .................................... *B65G 7/12* (2013.01)

(58) Field of Classification Search
CPC ............ A61F 2005/0183; A61F 5/0193; A61F 5/028; A61F 5/024; A61F 5/022; A61F 5/055; Y10S 2/919
See application file for complete search history.

(56) References Cited

U.S. PATENT DOCUMENTS

| | | | | |
|---|---|---|---|---|
| 2,828,737 A * | 4/1958 | Hale | ...................... | A61F 5/028 602/19 |
| 3,351,053 A * | 11/1967 | Stuttle | ..................... | A61F 5/024 602/19 |
| 3,717,143 A * | 2/1973 | Johnson | ................... | A61F 5/028 602/19 |
| 4,497,315 A * | 2/1985 | Fettweis | ............... | A61F 5/0193 602/19 |
| 4,667,624 A * | 5/1987 | Smith | ..................... | A01K 27/00 119/770 |
| 4,802,469 A * | 2/1989 | Gollestani | ............. | A61F 13/143 128/96.1 |
| 5,038,760 A * | 8/1991 | Osborn | ................... | A61F 5/028 602/19 |
| 5,042,092 A * | 8/1991 | Ewing | .................... | A41D 31/18 2/400 |
| 5,274,854 A * | 1/1994 | Wenner | .................... | A41B 9/02 2/403 |
| 5,363,863 A * | 11/1994 | Lelli | ....................... | A61F 5/028 128/876 |
| 5,398,340 A * | 3/1995 | Kibbee | ..................... | F41H 1/02 2/102 |
| D383,256 S * | 9/1997 | Hampton | ...................... | 119/770 |
| 6,047,665 A * | 4/2000 | Deveaux | ............. | A47D 13/086 119/770 |
| 6,308,341 B1 * | 10/2001 | Shelton | ..................... | A61F 7/02 2/400 |

(Continued)

*Primary Examiner* — Brian D Nash
(74) *Attorney, Agent, or Firm* — Gronholm Patent Services

(57) ABSTRACT

Various devices for providing various forces on a patient torso. One device includes a belt, a pubic pad, and a rear pad. Another device includes two "clamshell"—type members which capture the torso of a patient (aka user), and includes smaller sub portions within windows in at least one of the clamshell portions, for particular bracing purposes. Another device includes a type of "scuba suit" base garment which includes adjustable straps attached thereto for particular bracing purposes.

13 Claims, 23 Drawing Sheets

(56) References Cited

U.S. PATENT DOCUMENTS

| | | | | |
|---|---|---|---|---|
| 6,325,023 | B1* | 12/2001 | Elnatan | A47D 13/046 |
| | | | | 119/770 |
| 6,503,217 | B1* | 1/2003 | Gibbs | A61F 5/028 |
| | | | | 128/869 |
| 6,651,594 | B1* | 11/2003 | Bagwell | A47D 13/086 |
| | | | | 119/770 |
| 7,316,660 | B1* | 1/2008 | Modglin | A61F 5/024 |
| | | | | 602/19 |
| 7,900,586 | B2* | 3/2011 | Hamblen | A47D 13/086 |
| | | | | 119/770 |
| 9,452,100 | B2* | 9/2016 | Bigelow | A61F 5/03 |
| 10,166,135 | B2* | 1/2019 | Kamenaga | A61F 5/03 |
| 2003/0127479 | A1* | 7/2003 | Giggleman | A45F 3/14 |
| | | | | 224/260 |

* cited by examiner

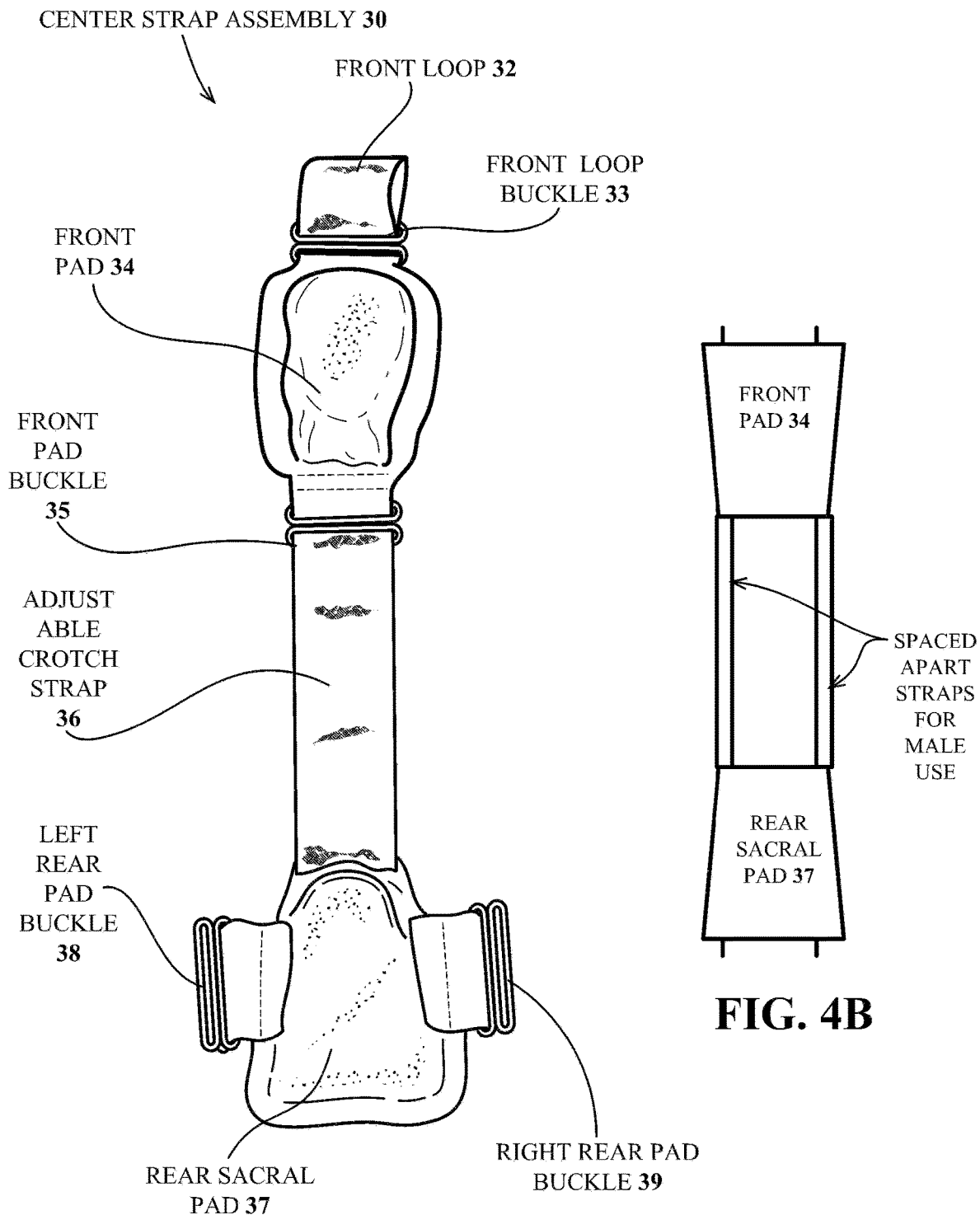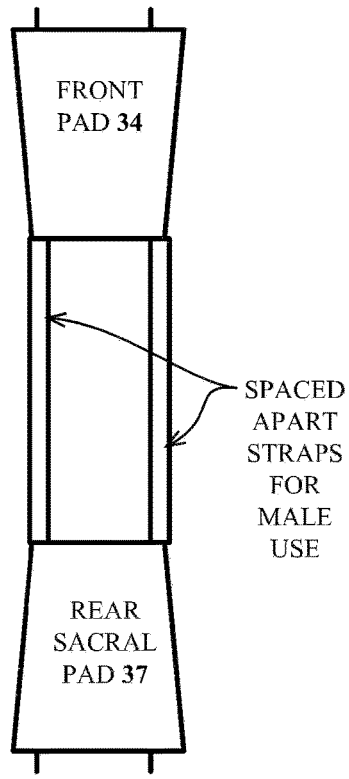
FIG. 4A
FIG. 4B

FRONT VIEW

FRONT VIEW

FRONT VIEW

REAR VIEW

PELVIC BRACES AND METHODS FOR USING SAME

FIELD

This disclosure relates to pelvic braces, bracing, and methods of using same.

BACKGROUND

The present invention relates generally to devices and methods for using same to bracing and applying various forces to the pelvic area of a human.

SUMMARY

The present invention comprises various braces and methods for using same for bracing and applying various forces to the pelvic area of a human.

Therefore, it is an aspect of the present invention to provide a pelvic brace assembly for use by a user to provide a bracing function, comprising: a belt for encircling the body of a user proximate the waist area; a front pubic pad configured to be attached relative to the belt proximate the anterior side of the user's body such that the pubic pad is in contact with the user and provides a bracing function; and a rear sacral pad configured to be attached relative to the belt proximate the posterior side of the user's body such that the sacral pad is in contact with the user and provides a bracing function; the front pubic pad and the rear sacral pad being relatively attached proximate the groin area.

It is a further aspect of the present invention to provide the above concept wherein the belt, front pubic pad and rear sacral pad combine to pull one bony prominence of the user towards another.

It is a further aspect of the present invention to provide the above concepts wherein the front pubic pad and the rear sacral pad are relatively attached proximate the groin area by an intermediate strap, the strap being adjustable so as to allow adjustment between the relative locations of the front pubic pad and the rear sacral pad.

It is a further aspect of the present invention to provide the above concepts wherein the attachment of the front pubic pad relative to the belt is made by an intermediate strap, the strap being adjustable so as to allow adjustment between the relative locations of the front pubic pad and the belt.

It is a further aspect of the present invention to provide the above concept wherein the adjustable strap between the front pubic pad and the belt is an adjustable front loop through which a portion of the belt may pass through so as to allow adjustment of the loop along the length of the belt.

It is a further aspect of the present invention to provide the above concept wherein circumferential tension about the belt line pulls both ilia towards the sacrum, and pushes the sacral pad anteriorly and the public pad posteriorly.

It is a further aspect of the present invention to provide the above concept wherein the rear sacral pad has left and right ridges which are prominent and articulate or fit into corresponding sacral sulci.

It is a further aspect of the present invention to provide the above concept wherein the front pubic pad and the rear sacral pad are relatively attached proximate the groin area by two spaced apart crotch straps, the spacing being provided to accommodate male genitalia therebetween.

It is a further aspect of the present invention to provide the above concept wherein the pubic pad includes an inverted U-shaped protuberance which cups around the pubic symphysis joint superiorly laterally and anteriorly.

It is a further aspect of the present invention to provide the above concept wherein the crotch strap tension pulls the sacrum and sacral coccygeal joints anteriorly which pulls the pubic pad posteriorly and inferiorly, and this combination rotates the ilia anteriorly.

It is a further aspect of the present invention to provide the above concept further comprising: a solo carrying strap attached relative to the belt proximate the anterior side of the user's body, the solo carrying strap configured for lifting a load separate from the user.

It is a further aspect of the present invention to provide the above concept wherein the brace is a first brace, and further comprising: a second brace, similar to the first brace, for use by a second user; an elongate carrying strap having opposing ends, each end attached relative to the belt of one of the respective braces, proximate the anterior side of the respective user's body, the carrying straps configured for lifting a load separate from the users.

It is a further aspect of the present invention to provide a pelvic brace assembly for use by a user to provide a bracing function, comprising: a front shell assembly configured to be attached proximate the anterior side of the user's body; and a rear shell assembly configured to be attached relative to the belt proximate the posterior side of the user's body; at least one connecting member connecting the front shell assembly relative to the rear shell assembly such that the two assemblies can be attached to the user; at least one of the front and rear shell assemblies including a main shell portion defining a window, and also including an independently adjustable shell portion section which fits within the window and is independently adjustable relative to the rest of the main shell portion.

It is a further aspect of the present invention to provide the above concept wherein the window is closed on all sides and wherein the adjustable shell portion section is a sacral pad configured to push the upper right quadrant of the sacrum anteriorly superiorly and left rotation.

It is a further aspect of the present invention to provide the above concept wherein the window is closed on all sides and wherein the adjustable shell portion section is a sacral pad configured to push the left lower quadrant anterior superior and rotating right.

It is a further aspect of the present invention to provide the above concept wherein the window is closed on all sides and wherein the adjustable shell portion section is a sacral pad configured to neutralize sacral rotation and sacral side bending and promote sacral counternutation.

It is a further aspect of the present invention to provide the above concept wherein the window is open on one side and wherein the adjustable shell portion section is an iliac crest pad configured to push the iliac crests anteriorly.

It is a further aspect of the present invention to provide the above concept wherein the window is open on one side and wherein the adjustable shell portion section is an iliac crest pad configured to move the ilia in an anterior rotation.

It is a further aspect of the present invention to provide the above concept wherein the window is open on one side and wherein the adjustable shell portion section is an ischial pad configured to provide medial pressure on the left ischium, or to stabilize rotation of the ilia.

It is a further aspect of the present invention to provide the above concept wherein a spiral strap is used to push on the ischial pad.

It is a further aspect of the present invention to provide the above concept wherein the independently adjustable shell portion section, which fits within the window and is independently adjustable relative to the rest of the main portion, is pivotably mounted relative to the main portion, such that a force against the outer surface of the shell portion section causes the shell portion section to pivot relative to the main portion as the shell portion section moves towards the user's body, the movement causing a preselected desired bracing function.

It is a further aspect of the present invention to provide the above concept wherein the pivoting mounting is provided by use of a flexible strap.

It is a further aspect of the present invention to provide the above concept wherein the movement of the shell portion section is provided by use of an elongate tensile string member provided in variable tension by an adjustable dial and the string member laterally biased against the outside of the shell portion section, such that rotation of the dial in one direction causes the string member to be in increased tension, thus providing more force against the shell portion section, and causing the shell portion section to move in a direction towards the user, and such that rotation of the dial in an opposite direction causes the string member to be in decreased tension, thus providing less force against the shell portion section, and causing the shell portion section to move in a direction away from the user.

It is a further aspect of the present invention to provide pelvic brace assembly for use by a user to provide a bracing function, comprising: a base elastic garment having an interior surface having a preselected level of gripping relative to the user's skin; and at least one strap configured to be attached relative to the base garment, such that tension in the strap provides the bracing function in the form of pulling of one bony protuberance towards another.

It is a further aspect of the present invention to provide the above concept wherein the strap is elongate and has two ends attached relative to two corresponding sections of the base elastic garment, wherein at least one of the two corresponding sections of the base elastic garment is in frictional contact with a corresponding portion of the user's skin; such that tension in the strap causes a force to be transmitted from the one section of the base elastic garment to the corresponding portion of the user's skin.

It is a further aspect of the present invention to provide the above concept wherein the force includes a pulling force along the length of the straps, as well as to provide a sideward lateral force transverse to the longitudinal axis of the elongate straps and towards the body of the user.

It is a further aspect of the present invention to provide the above concept wherein the location of the strap is adjustable by the use of hook and loop fasteners.

It is a further aspect of the present invention to provide the above concept wherein the strap is a crotch strap, to anteriorly rotate the ilia and adduct the ischial tuberosities.

It is a further aspect of the present invention to provide the above concept wherein the crotch strap extends from its "front" end proximate the left iliac crest and ASIS anterior superior spine of the wearer, through the crotch, and upward and across the body such that its "rear" end is proximate the right buttock of the wearer proximate a location inferior and lateral to the right ischial tuberosity.

It is a further aspect of the present invention to provide the above concept further comprising a second crotch strap which extends from its "front" end proximate the right iliac crest and ASIS anterior superior spine of the wearer, through the crotch, and upward and across the body such that its "rear" end is proximate the left buttock of the wearer proximate a location inferior and lateral to the left ischial tuberosity.

It is a further aspect of the present invention to provide the above concept wherein the crotch strap extends from its "front" end proximate the right iliac crest and ASIS anterior superior spine of the wearer, through the crotch, and upward and across the body such that its "rear" end is proximate the left buttock of the wearer proximate a location inferior and lateral to the left ischial tuberosity.

It is a further aspect of the present invention to provide the above concept wherein the strap is a spiral strap configured such that as the foot advances during gait, the strap causes the user to experience an anterior rotation force of the ilia, as opposed to a posterior rotation force as is normally encountered.

It is a further aspect of the present invention to provide the above concept wherein the strap is a spiral strap extending in a spiral path from an upper location to a lower location on the base garment, the spiral path staying on one side of the sagittal plane and being as follows: the spiral path beginning at the upper location being on the rear of the garment and proximate the PSIS and posterior iliac crest, and to the one side of the sagittal plane, the spiral path continuing from the upper location and extending away from the sagittal plane, forward through the frontal plane, and around the body of the user to the front of the user as it also continues downward, the spiral path continuing to spiral as it passes below the groin area and against the inside of the thigh and again through the frontal plane, the spiral path terminating at the lower location being on the rear of the garment and behind the thigh inferior to the hamstring muscle belly.

It is a further aspect of the present invention to provide the above concept further comprising a second spiral strap similar to the first, but positioned on the opposite side of the user, on the other side of the sagittal plane.

It is a further aspect of the present invention to provide the above concept further comprising a spiral strap to be used with the crotch strap, the spiral strap configured such that as the foot advances during gait, the strap causes the user to experience an anterior rotation force of the ilia, as opposed to a posterior rotation force as is normally encountered.

It is a further aspect of the present invention to provide the above concept wherein the strap is a transverse iliac crest strap pulls the left and right iliac crests towards the midline of the body, the transverse iliac crest strap having ends proximate a corresponding anterolateral to lateral iliac crest region of the user.

It is a further aspect of the present invention to provide the above concept wherein the strap is a transverse ischial tuberosity strap pulls the left and right ischial tuberosities towards the midline of the body, the transverse iliac crest strap having ends proximate locations generally lateral to the corresponding left and right ischial tuberosities of the user.

These and other aspects will become readily apparent upon further review of the following specification and drawings. Other objects, features, and advantages of the present invention will become apparent upon reading the following detailed description of the preferred embodiment of the invention when taken in conjunction with the drawing and the appended claims.

BRIEF DESCRIPTION OF THE DRAWINGS

FIG. 4A shows the center strap assembly 30, which includes a front loop 32, a front loop buckle 33, a front (aka pubic) pad 34, a front pad buckle 35, an adjustable crotch strap 36, a rear (sacral) pad 37, a left rear pad buckle 38, and a right rear pad buckle 39.

FIG. 4B shows an alternate configuration in which the adjustable crotch strap 36 is replaced by two similarly configured but thinner straps which provide spacing for male genitalia.

FIG. 7 shows a solo carrying strap 50 which has both ends attached to the same person to allow that person to carry a load on the middle of the strap.

FIG. 8 shows a tandem carrying strap 60 which has its two different ends attached to two different persons to allow those two persons to carry a load on the middle of the strap. In each case the load is transferred directly to the pelvis and liberates or abolishes forces to the cervical, thoracic and lumber spine, and shoulders.

FIG. 13 shows parts of the front panel assembly 120.

Figure 1:
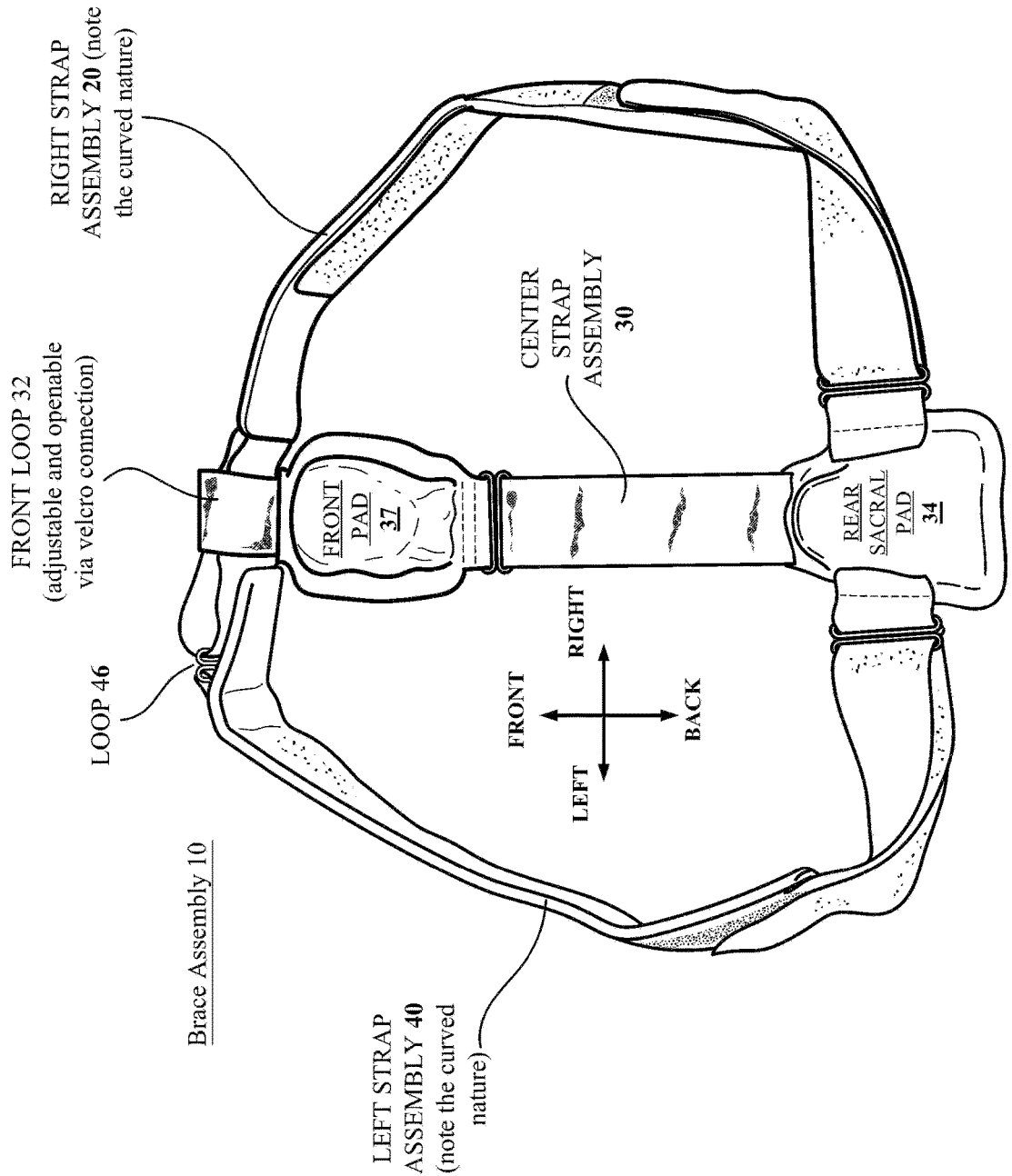
FIG. 1 shows a first embodiment brace assembly 10 according to the present invention, which includes a right strap assembly 20, a center strap assembly 30, and a left strap assembly 40.

The transverse iliac crest strap 350 is elongate and has two ends (left and right) configured to engage left and right anterior and lateral iliac crest hook-loop pads 352-L, 352-R. The left and right anterior and lateral iliac crest hook-loop pads 352-L, 352-R are generally atop a corresponding anterolateral to lateral iliac crest region. Tension in the transverse iliac crest strap 350 tends to pull the left and right iliac crests to the midline.

The transverse ischial tuberosity strap 360 is elongate and has two ends (left and right) configured to engage left and right ischial tuberosity hook-loop pads 362-L, 362-R, respectively, each of which are located generally atop locations lateral to the corresponding left and right ischial tuberosities. Tension in the transverse ischial tuberosity strap 360 tends to pull the left and right ischial tuberosities to the midline.

DETAILED DESCRIPTION

Introduction

The present invention now will be described more fully hereinafter with reference to the accompanying drawings, in which some, but not all embodiments of the inventions are shown. This invention may be embodied in many different forms and should not be construed as limited to the embodiments set forth herein; rather, these embodiments are provided so that this disclosure will satisfy applicable legal requirements. Like numbers refer to like elements throughout.

Reference is now made to the figures, in which like elements indicate like elements throughout the several views.

ELEMENT LIST

Here is a list of the various elements:
10 Brace Assembly (first embodiment)
20 Right Strap Assembly
  22 Right Strap Padded Portion
  24 Right Rear Adjustable Strap
  26 Right Front Adjustable Strap
30 Center Strap Assembly
  32 Front Loop
  33 Front Loop Buckle
  34 Front Pad (aka pubic pad)
  34B Front Pad (aka pubic pad)—second version
  35 Front Pad Buckle
  36 Adjustable Crotch Strap (solid for female spaced apart for male)
  37 Rear Sacral Pad
    37R Right Ridge
    37L Left Ridge
  38 Left Rear Pad Buckle
  39 Right Rear Pad Buckle
40 Left Strap Assembly
  42 Left Strap Padded Portion
  44 Left Rear Adjustable Strap
  46 Loop
50 Solo carrying strap
60 Tandem carrying strap
100 Brace Assembly (second embodiment)
120 Front panel assembly
  122 Front panel body member
  127 Right Iliac Crest Pad Adjustment Knob
  128 Left Iliac Crest Pad Adjustment Knob
  130 Side Gaps Adjustment Knob
  131 SFMP Strap front mounting point
140 Rear Panel Assembly
  142 Rear Panel Body Member
  144 Rear Sacral Pad
  144S Rear Sacral Pad Straps (2)
  145 Rear Sacral Pad Adjustment Knob
  145 TW Rear Sacral Pad Adjustment Knob Tension Wire
  146 Rear Sacral Window
  147R, 147L Right and Left Slots
  148 Right Iliac Crest Pad
  148 TW Right Iliac Crest Pad Tension Wire
  149 Left Iliac Crest Pad
  149W Open-sided Iliac Crest window (2, one left and one right)
  149 TW Left Iliac Crest Pad Tension Wire
160. Right Spiral Strap Assembly
  162 Right Strap
  164 Right Ischial Strap Pad
  166 Right Strap Front Mounting End
  168 Right Strap Rear Mounting End Location
170. Left Spiral Strap Assembly
  172 Left Strap
  174 Left Ischial Strap Pad
  176 Left Strap Front Mounting End
  178 Left Strap Rear Mounting End Location
181 Quick release for crotch strap
182 Crotch strap w soft window
183 Crotch strap fasteners (FIG. 16)
184 L, R Left and Right D rings
190R Right pull up loop
300 Brace Assembly
  310 base garment
    311-L left front (aka ASIS anterior iliac crest) hook-loop pad
    311-R right front (aka ASIS anterior iliac crest) hook-loop pad
    312-L left upper rear (aka PSIS posterior iliac crest) hook-loop pad
    312-R right upper rear (aka PSIS posterior iliac crest) hook-loop pad
    313-L left buttock (aka ischial tuberosity) hook-loop pad
    313-R right buttock (aka ischial tuberosity) hook-loop pad
    314-L left lower rear (aka posterior thigh distal hamstring) hook-loop pad
    314-R right lower rear (aka posterior thigh distal hamstring) hook-loop pad
  316 First Crotch Strap
  317 Second Crotch Strap
  318 Right Spiral Strap
  319 Left Spiral Strap
  320 belt assembly
    350 Transverse iliac crest strap assembly
      352-R right iliac crest hook-loop pad
      352-L left iliac crest hook-loop pad
    360 Transverse ischial tuberosity strap assembly
      362-R right ischial tuberosity hook-loop pad
      362-L left ischial tuberosity hook-loop pad

DISCUSSION

Figure 2:
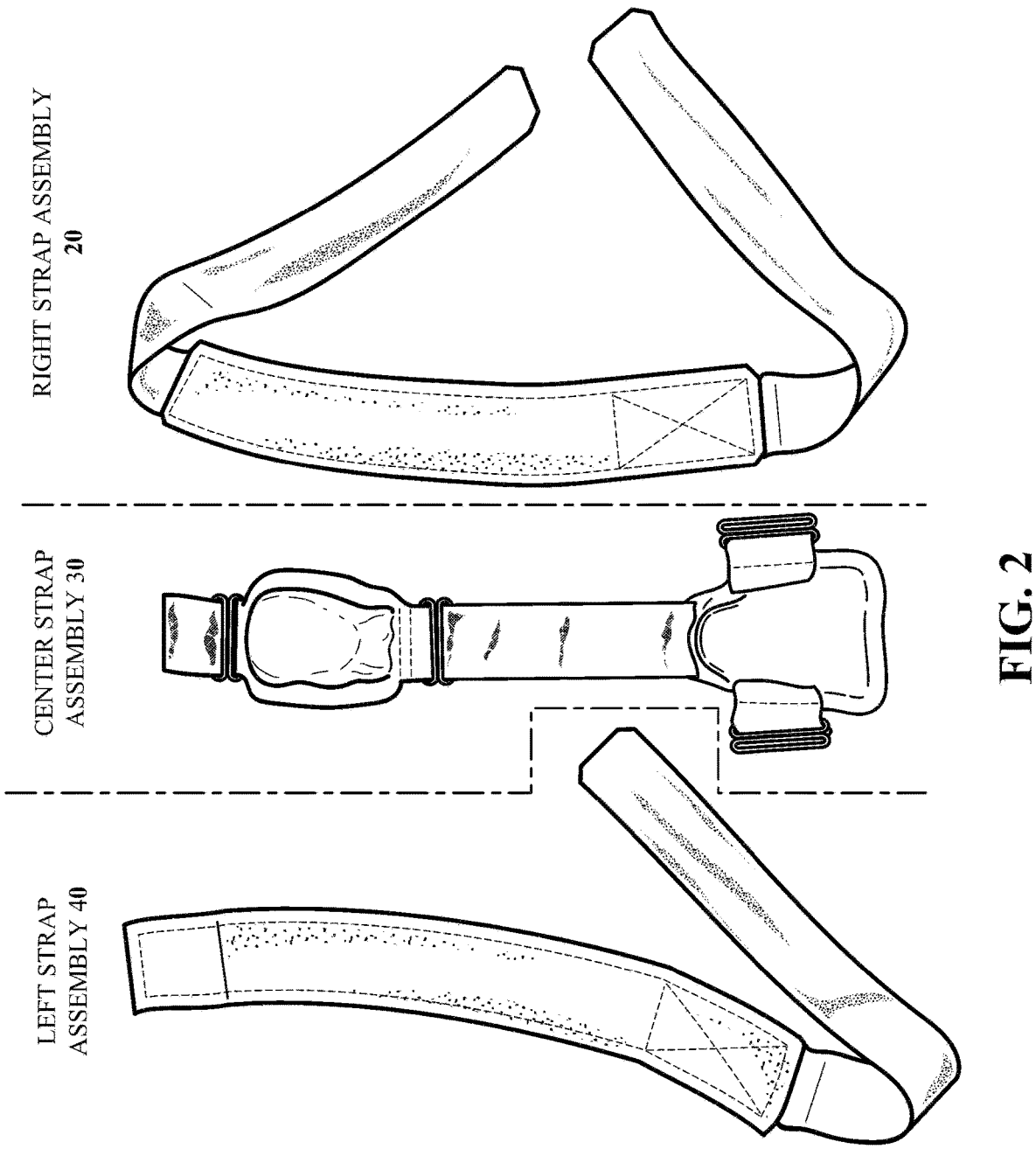
FIG. 2 shows the first embodiment brace assembly according to the present invention, with the right strap assembly 20, center strap assembly 30, and left strap assembly 40 disassembled from each other.

FIGS. 1-2 shows a first embodiment brace assembly 10 according to the present invention, which includes a right strap assembly 20, a center strap assembly 30, and a left strap assembly 40. Also shown is a front loop 32 of the center strap assembly 30 and a front loop 46 of the left strap assembly 40.

Figure 3:
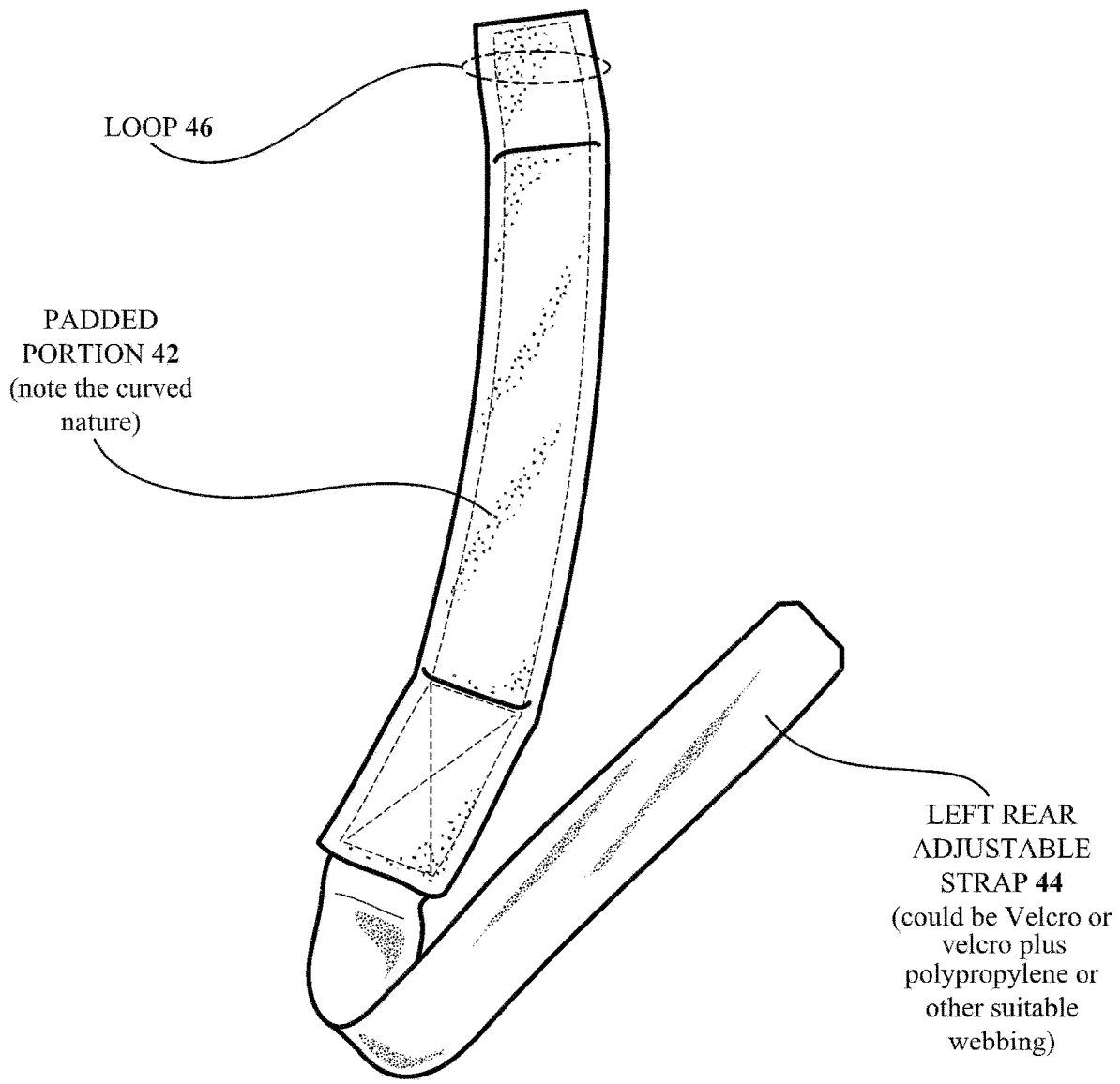
FIG. 3 shows the left strap assembly 40, which includes a padded portion 42 and a rear adjustable strap 44.

As shown in FIG. 3, the left strap assembly 40 includes an elongate padded portion 42, a left rear adjustable strap 44, and a front loop 46. The elongate padded portion 42 includes a padded feature which provides comfort to the side of the user proximate the left hip area. The left rear adjustable strap 44 extends from the rear of the padded portion and is configured to pass through a buckle 38 of the center strap assembly 30, and then such is detachably fixable to itself through hook-and-loop connection such as the Velcro brand. Through this adjustable detachable connection, the effective length of the left strap assembly 40 can be adjusted by adjusting the length of the left rear adjustable strap 44.

Figure 5:
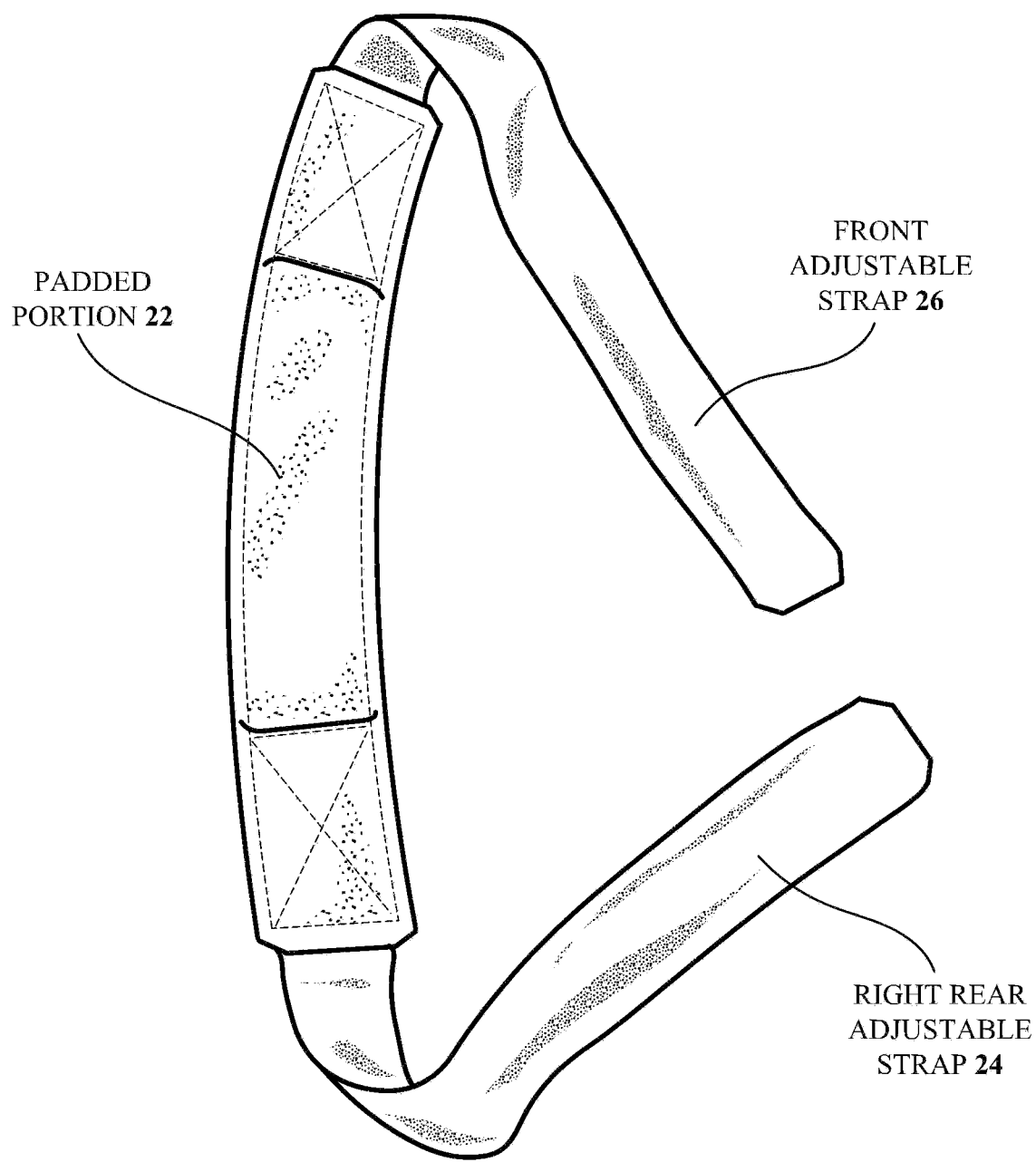
FIG. 5 shows the right strap assembly 20, which includes a padded portion 22 and a right front adjustable strap 24. Velcro or Velcro plus polypropylene straps can be used.

As shown in FIG. 5, the right strap assembly 20 includes an elongate, curved, padded portion 22, a right rear adjustable strap 24, and a front adjustable strap 26. Elongate padded portion 22 includes a padded feature which provides comfort to the side of the user proximate the right hip area. The right rear adjustable strap 24 extends from the rear of the elongate padded portion 22, and is configured to pass through a buckle 39 of the center strap assembly 30, and then such is detachably fixable to itself through a hook-and-loop connection such as the Velcro brand. Through this adjustable detachable connection, the effective length of the left strap assembly 20 can be adjusted by adjusting the length of the right front adjustable strap 24.

Extending from the front of the elongate padded portion 22 is the front adjustable strap 26, which as shown in FIG. 1 extends from the padded portion 22, passes through the front loop 32 of the center strap assembly 30, then around a loop 46 of the left strap assembly 40, then passes back again through the front loop 32, and is then detachably fixable to itself through a hook-and-loop connection such as the Velcro brand. Through this adjustable detachable connection, the effective length of the right strap assembly 20 can also be adjusted by adjusting the length of the front adjustable strap 26.

FIG. 4A shows the center strap assembly 30, which includes a front loop 32, a front loop buckle 33, a front pad 34, a front pad buckle 35, an adjustable crotch strap 36, a rear sacral pad 37, a left rear pad buckle 38, and a right rear pad buckle 39.

The front loop 32 is configured to accept the adjustable strap 36 as described above. Its length can be adjusted, and it can be opened and closed via a Velcro connection. The front loop 32 is attached to the front pad 34 via a front loop buckle 33, which is attached at its other end to one side of the front pad buckle 35. The other side of the front pad buckle 35 is attached to the front end of the adjustable crotch strap 36. The adjustable crotch strap 36 can be adjusted in length, and it can be opened and closed via a Velcro connection. The rear end of the adjustable crotch strap 36 is attached to the front end of the rear sacral pad 37. A left rear pad buckle 38 extends from the left side of the rear pad 37, and a right rear pad buckle 39 extends from the right side of the rear pad 37. The right rear pad buckle 39 attaches to the right strap assembly 20 and the left rear pad buckle 38 attaches to the left strap assembly 40.

Figure 6:
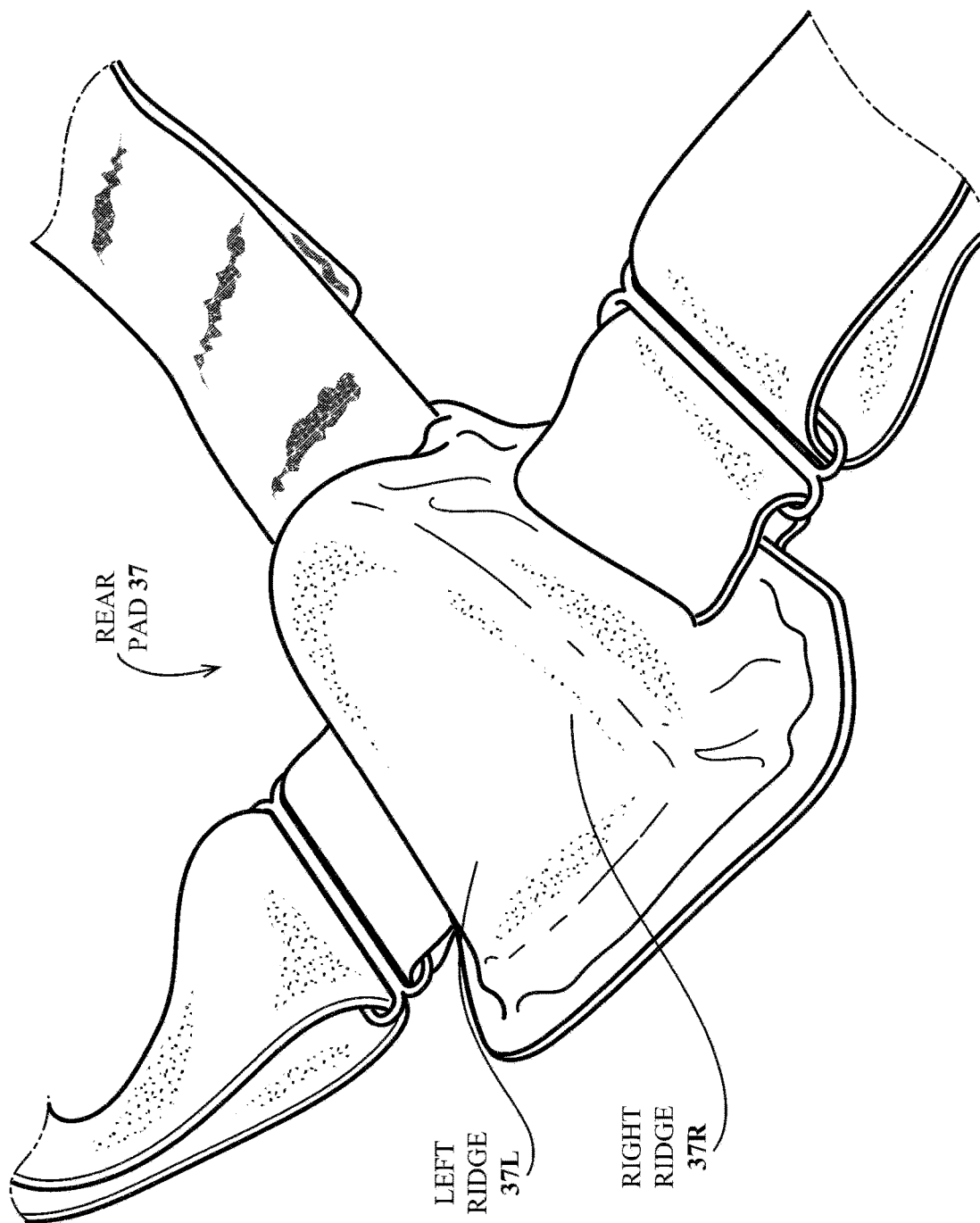
FIG. 6 shows the rear pad 37, which includes left and right ridges 37L and 37R. The ridges are prominent and articulate or fit into corresponding sacral sulcii.

FIG. 6 shows the rear pad 37, which includes left and right ridges 37L and 37R. The ridges are prominent and articulate or fit into corresponding sacral sulcii.

The right strap assembly 20, left strap assembly 40, and front pad 37 (and its two buckles 38. 39) of the center strap assembly 30 combine to provide an effective "belt" about the waist of the user.

This "belt" also supports the center strap assembly 30, by supporting its front loop 32 at the front, and the rear pad 37 at the rear.

Figure 19:
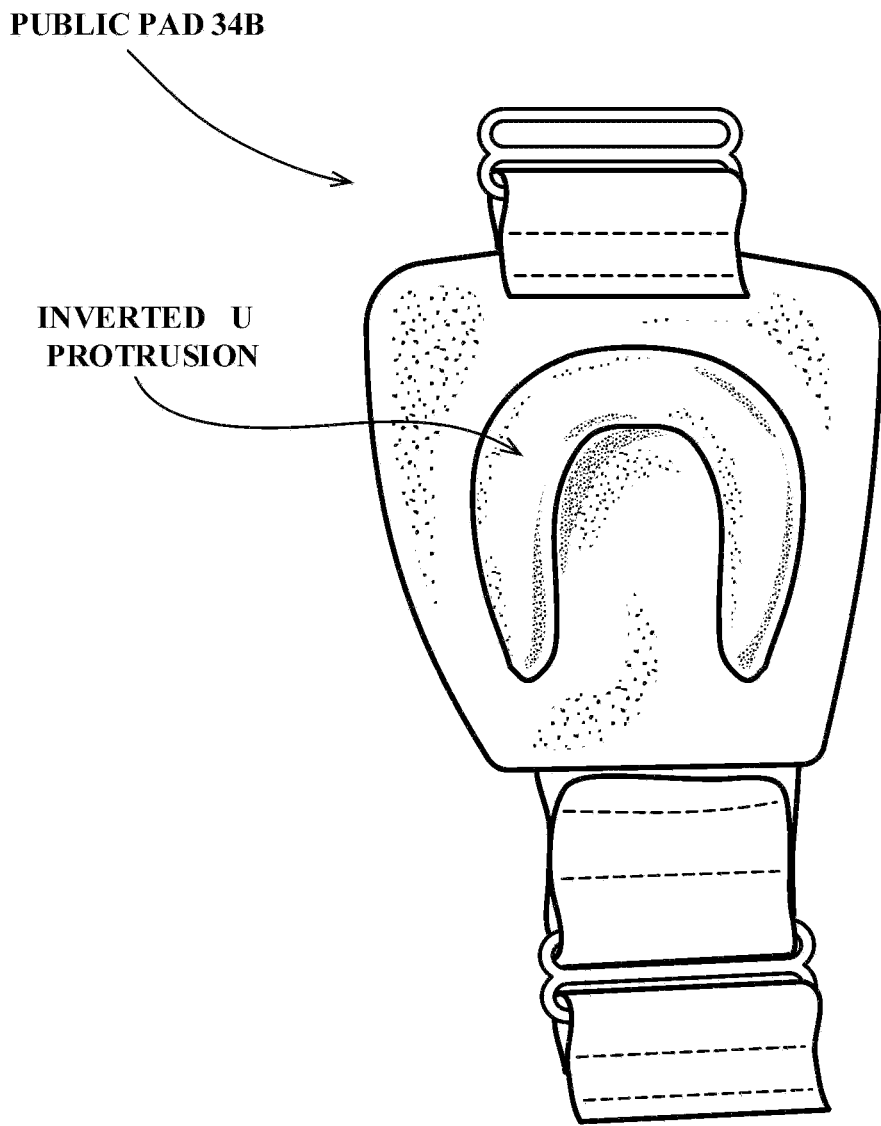
FIG. 19 shows a second version of the pubic pad, as compared to the first version 34 shown in, for example, FIG. 4A. This pubic pad is generally similar to the pad 34 in the way it attaches to other members, but a difference is that the pad 34B includes an inverted "U" protrusion which could also be seen as a "horseshoe shaped" protrusion above the otherwise flat surface of the pad 34B. This shape allows for a cupping action such that the pubic pad "cups" around pubic symphysis joint superiorly, laterally and anteriorly, assuming the right sizing and height is selected. It should be understood that the pad could be sized as needed so as to fit the width and the height of the pubic symphysis joint and tubercles.

FIG. 19 shows a second version of the pubic pad, as compared to the first version 34 shown in, for example, FIG. 4A. This pubic pad is generally similar to the pad 34 in the way it attaches to other members, but a difference is that the pad 34B includes an inverted "U" protrusion which could also be seen as "horseshoe shaped". This shape allows for a cupping action such that the pubic pad "cups" around pubic symphysis joint superiorly, laterally and anteriorly, assuming the right sizing is selected. It should be understood that the pad could be sized as needed so as to fit the width and the height of the pubic symphysis joint and tubercles.

Initial Fitting and Adjustment

The front pubic pad is adjustable in height relative to the remainder of the device, as need to accommodate different patient anatomy. This can be done by manipulation of the front loop, so as to situate the pubic pad proximate the height of the beltline (define), or below the beltline as needed.

Initial fitting is done by an authorized practitioner and is done as follows.

Initially the device is configured loosely as shown in FIG. 1.

The sacral pad 37 is positioned relative to the patient by having the patient lay supine atop the pad, such that it is generally centered on the posterior surface of the sacrum. Then the front pubic pad 34 (or 34B) is positioned on the pubic tubercles. Once the two pads 37, 34, are initially positioned, then adjustment is made of the various straps.

First the transverse strap below the iliac crest and above or at the pubic symphysis.

The front ends of the left and right strap assemblies are brought together such that they overlap and are approximately atop the public pad. Then the free end of the front adjustable strap 26 is passed through the front loop 32, through the loop 46, and then back through the front loop such that the free end of the front adjustable strap 26 is brought over itself and is secured via Velcro.

The next step is adjustment of the crotch strap, which is done by shortening or lengthening the center strap assembly 30, such that tension exists between the two pads while in their desired positions.

The patient is then turned over to the prone position while the nurse/physical therapist holds the pads in place. Then the two rear adjustable straps 24, 44, of the two side assemblies 20, 40, are then simultaneously tightened and then secured such there is a circumferential tension about the belt line which pulls both ilia towards the sacrum, and pushes the sacral pad anteriorly and the public pad posteriorly.

At this point, the initial adjustment by the nurse/therapist is preferably complete.

If desired marks on the straps can be provided at this point to allow for a return to this positioning.

For a female to void, she can either open the front loop 32, or she could open crotch strap 36 (see FIG. 4A) and pull it through buckle 35. For a male he could either open the front loop 32 as show in FIG. 4B or remove the two spaced apart straps.

To remove the entire assembly, either a male of female can further separate the right strap assembly 20 from the left strap assembly 40.

Subsequent adjacent may be done by user as desired—typically this will be limited to adding a notch to the belt length proximate the belt buckle area.

Note that for the male version (two straps as shown in FIG. 4B), one strap can be adjusted so as to focus on one side of the pubic bone.

This embodiment 10 provides the following:

Offers stability to the pelvis by:
    offering a posterior to anterior force of the sacrum in Sagittal plane
    neutralizing the sacral rotation in Transverse plane neutralizing the sacral side bend in Frontal plane offers a counter nutation force of the sacrum in the Sagittal plane, thereby centering the sacrum within the pelvis offers an anterior to posterior force of the pubic bones independently and/or symmetrically in the Sagittal plane offers anterior rotation Force of the ilia independently or bilaterally in Sagittal plane pulls the left ilium medially towards sacrum in Transverse plane pulls the right ilium medially towards sacrum in Transverse plane stabilizes outflare of the Ilia independently or bilaterally in the Transverse plane.

Figure 7:
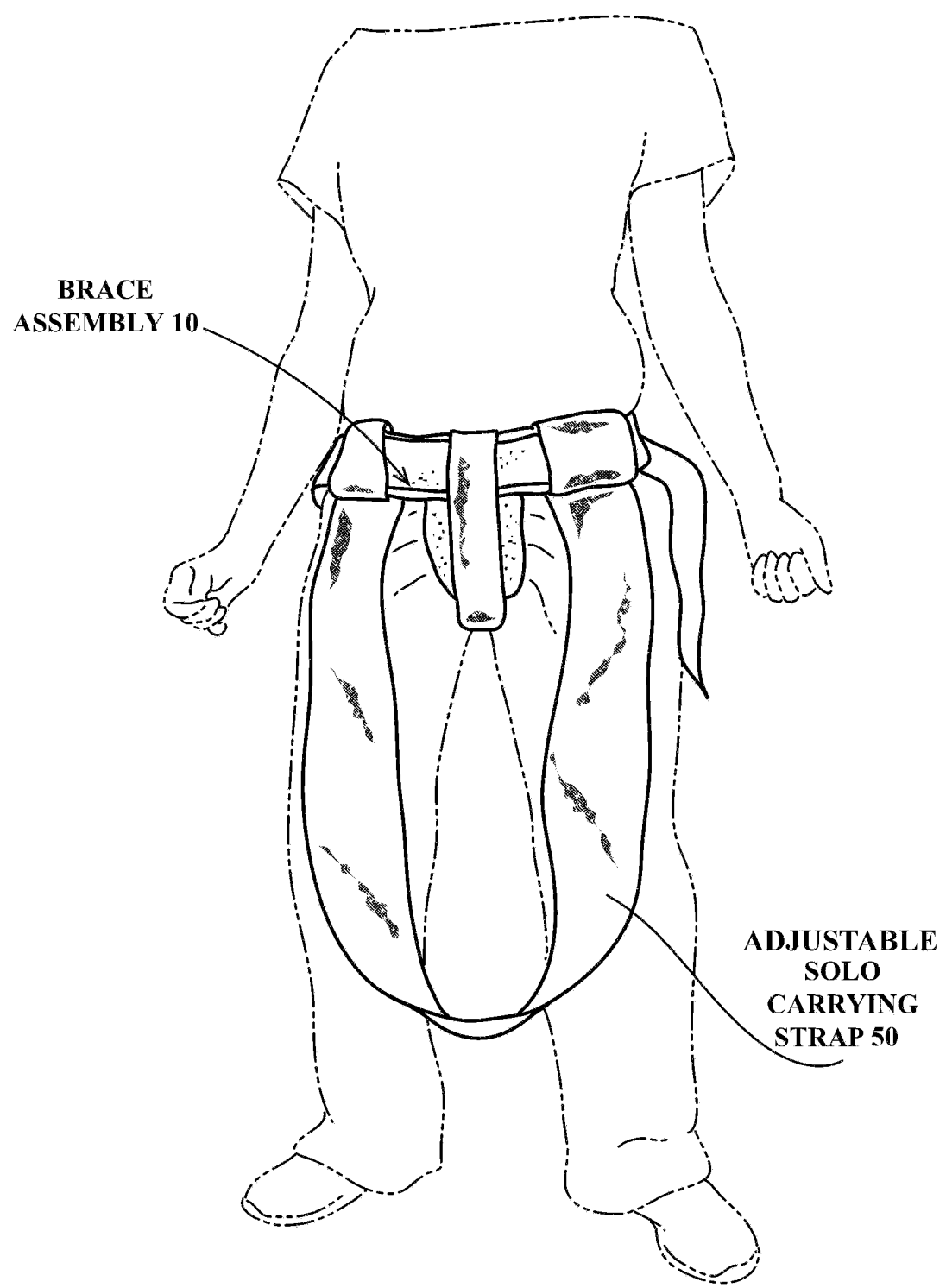
FIGS. 7-8 show the first embodiment with the addition of strap(s) allowing for carrying of an external load by one or two people by placing a load directly on the pelvis.
Figure 8:
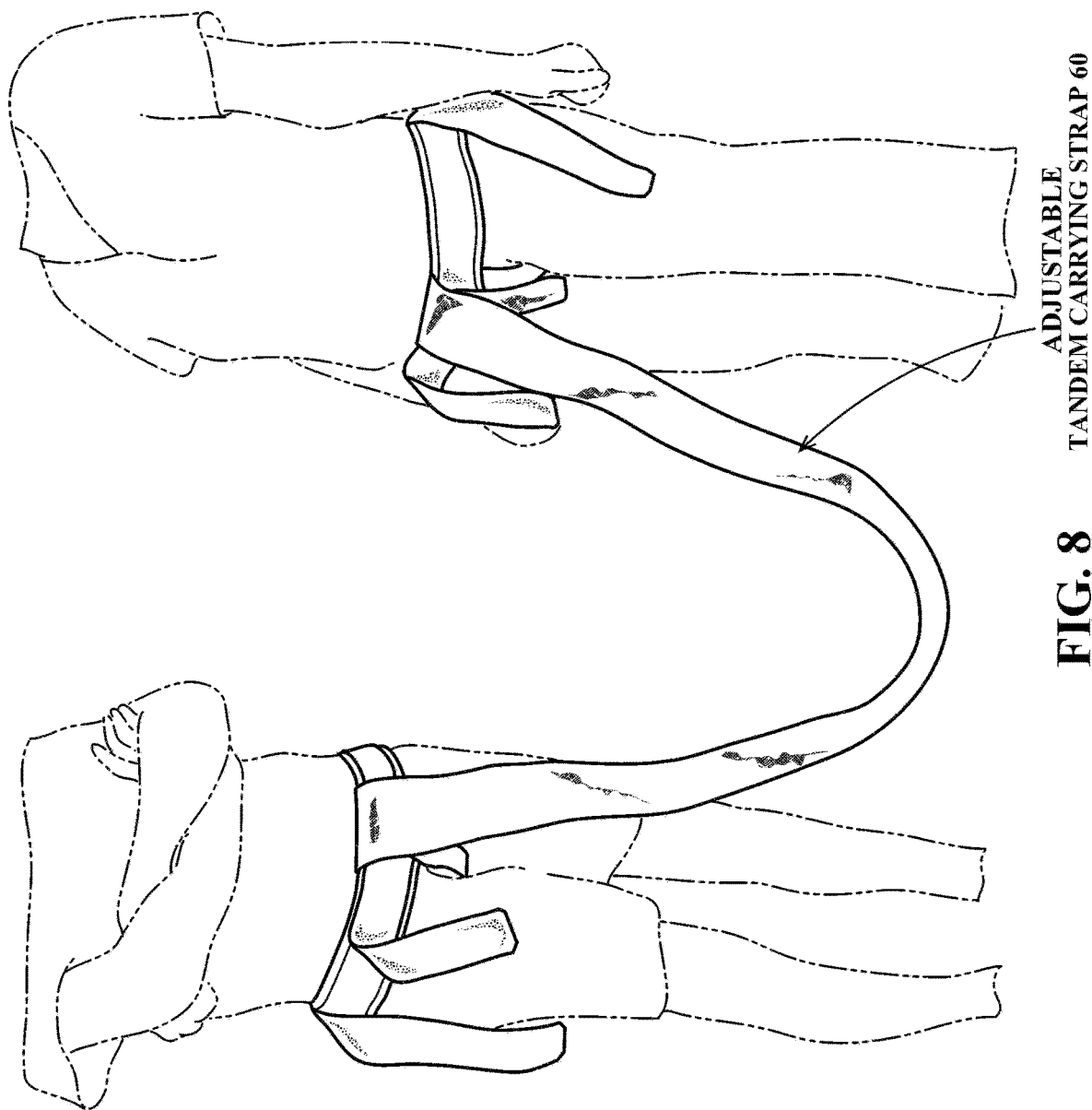

FIGS. 7-8 show the first embodiment with the addition of strap(s) allowing for carrying of an external load by one or two people by placing a load directly on the pelvis. FIG. 7 shows a solo carrying strap 50 which has both ends attached to the same person to allow that person to carry a load on the middle of the strap.

FIG. 8 shows a tandem carrying strap 60 which has its two different ends attached to two different persons to allow those two persons to carry a load on the middle of the strap. In each case the load is transferred directly to the pelvis and liberates or abolishes forces to the cervical, thoracic and lumber spine, and shoulders.

Reference is now made generally to FIGS. 9-16, which generally relate to a brace assembly 100, which includes the following:

Front panel assembly 120
Rear panel assembly 140
Right Spiral Strap Assembly 160
Left Spiral Strap Assembly 170

Generally described, the front and rear panel assemblies 120, 140, combine in a clamshell relationship to enclose the lower torso of a wearer in order to provide at least some of the functions described previously in regard to the first embodiment, when the right and left spiral strap assemblies 160, 170, are in place.

Note that the configuration shown, a pubic pad was not used. However, it could be added if desired. In this case, the posterior iliac crest pads were sufficient to bring the ASIS's in line with the pubic bones in the frontal plane.

Figure 9:
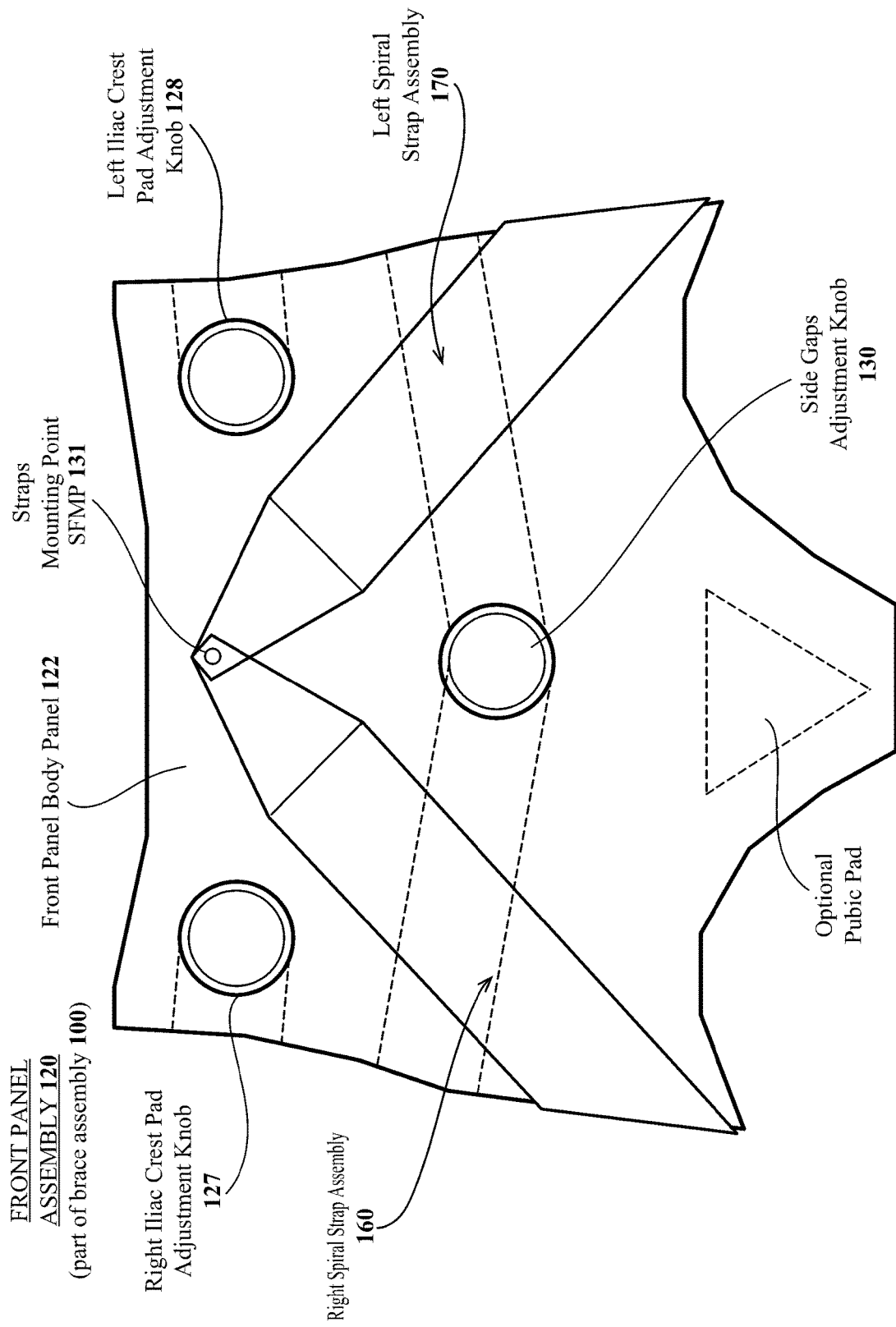
FIG. 9 shows a front panel assembly 120 of a brace assembly 100, along with parts of a right spiral strap assembly 160 and a left spiral strap assembly 170. The front panel assembly 120 includes front panel body member 122 having attached thereto a right iliac crest pad adjustment knob 127, a left iliac crest pad adjustment knob 128, and a side gaps adjustment knob 130.
Figure 10:
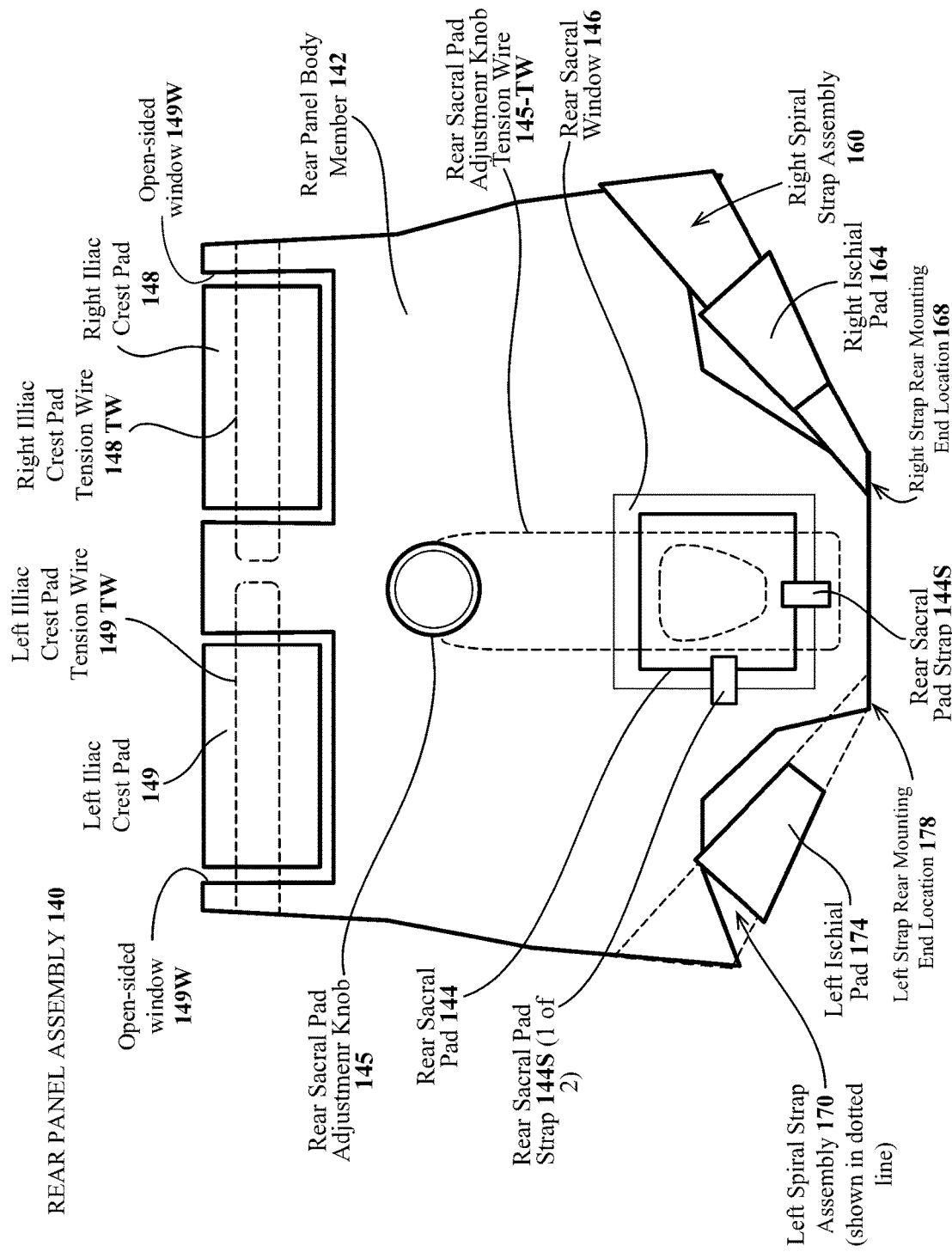
FIG. 10 shows a rear panel assembly 140 of the second embodiment brace assembly 100, including a rear panel body member 142, a rear sacral pad 144 (which includes a semirigid rectangular portion on the outside and a softer part (in dashes in FIG. 10) on the inside for pushing on the body), rear sacral pad adjustment knob 145, rear sacral pad adjustment knob tension wire 145-TW, right iliac crest pad 148, right iliac crest pad tension wire 148-TW, left iliac crest pad 149, and left iliac crest pad tension wire 149-TW. The rear sacral pad 144 fits within the rear sacral window 146 which is a closed window opening extending through the rear body panel member. Two sacral pad straps 144S are shown attaching the pad 144 relative to the body member 142. A closed window opening is an opening such as shown at 146, in that the outer edges of the opening form the periphery of the opening. An open-sided window opening, in comparison, and shown elsewhere, has one side open, such as shown in two locations in FIG. 10 as 149W.
Figure 11:
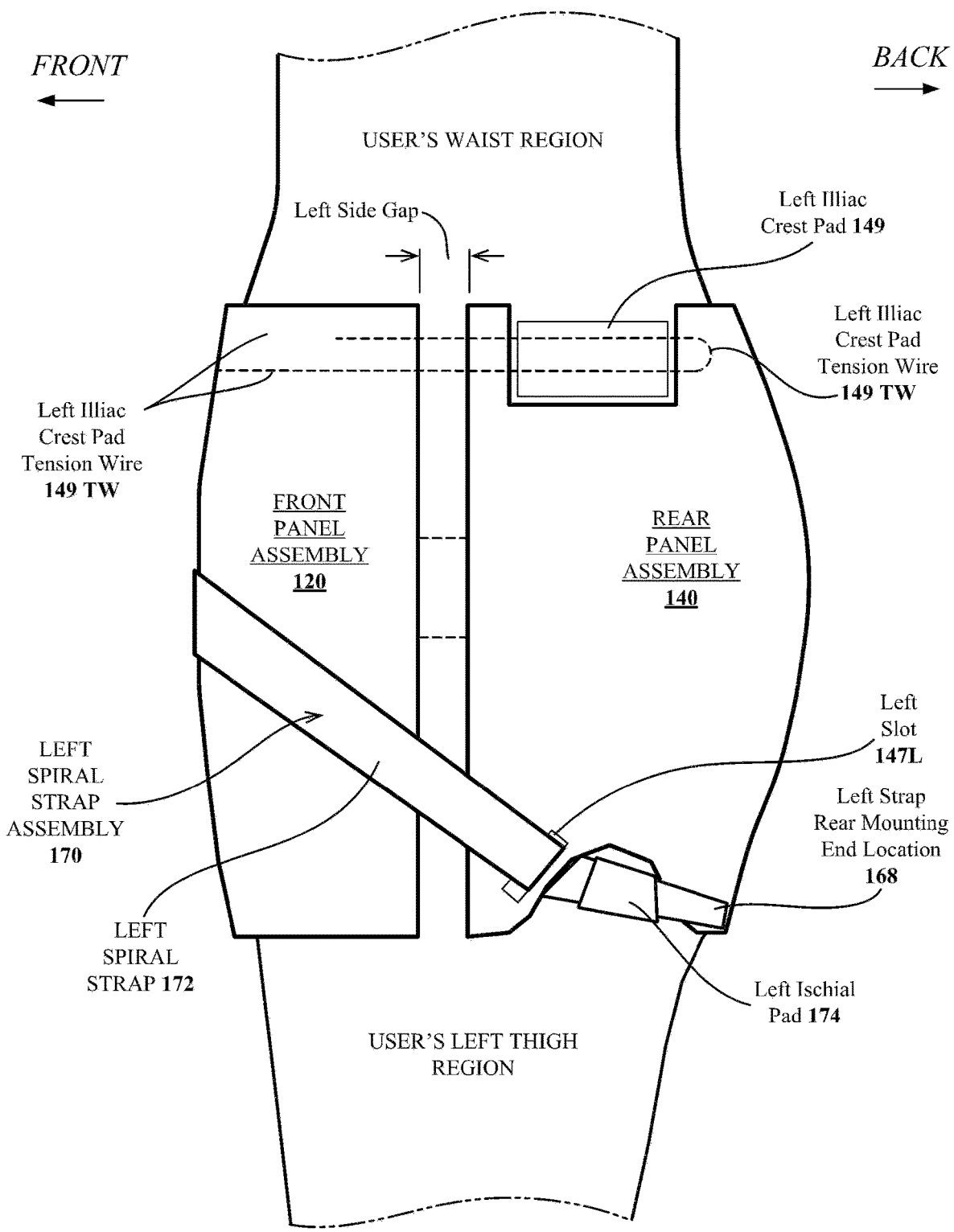
FIG. 11 shows a brace assembly 100, which includes a front panel assembly 120, a rear panel assembly 140, and left and right spiral strap assemblies 160, 170 (160 not shown in this figure). Shown in this figure as part of the left spiral strap assembly 170 is a left spiral strap 172, left ischial strap pad 174, and left strap rear mounting location 178.

Reference is first made generally to FIGS. 9-11.

FIG. 9 shows the front panel assembly 120 of the second embodiment brace assembly 100, along with parts of a right spiral strap assembly 160 and a left spiral strap assembly 170. The front panel assembly 120 includes front panel body member 122 having attached thereto a right iliac crest pad adjustment knob 127, a left iliac crest pad adjustment knob 128, and a side gaps adjustment knob 130.

FIG. 10 shows a rear panel assembly 140 of the second embodiment brace assembly 100, including a rear panel body member 142, a rear sacral pad 144 (which includes a semirigid rectangular portion on the outside and a softer part (in dashes in FIG. 10) on the inside for pushing on the body), rear sacral pad adjustment knob 145, rear sacral pad adjustment knob tension wire 145-TW, right iliac crest pad 148, right iliac crest pad tension wire 148-TW, left iliac crest pad 149, and left iliac crest pad tension wire 149-TW. The rear sacral pad 144 fits within the rear sacral window 146 which is a closed window opening extending through the rear body panel member. Two sacral pad straps 144S are shown attaching the pad 144 relative to the body member 142. A closed window opening is an opening such as shown at 146, in that the outer edges of the opening form the periphery of the opening. An open-sided window opening, in comparison, and shown elsewhere, has one side open, such as shown in two locations in FIG. 10 as 149W.

FIG. 11 shows a second embodiment brace assembly 100, which includes a front panel assembly 120, a rear panel assembly 140, and left and right spiral strap assemblies 160, 170 (160 not shown in this figure). Shown in this figure as part of the left spiral strap assembly 170 is a left spiral strap 172, left ischial strap pad 174, and left strap rear mounting location 178.

Figure 12:
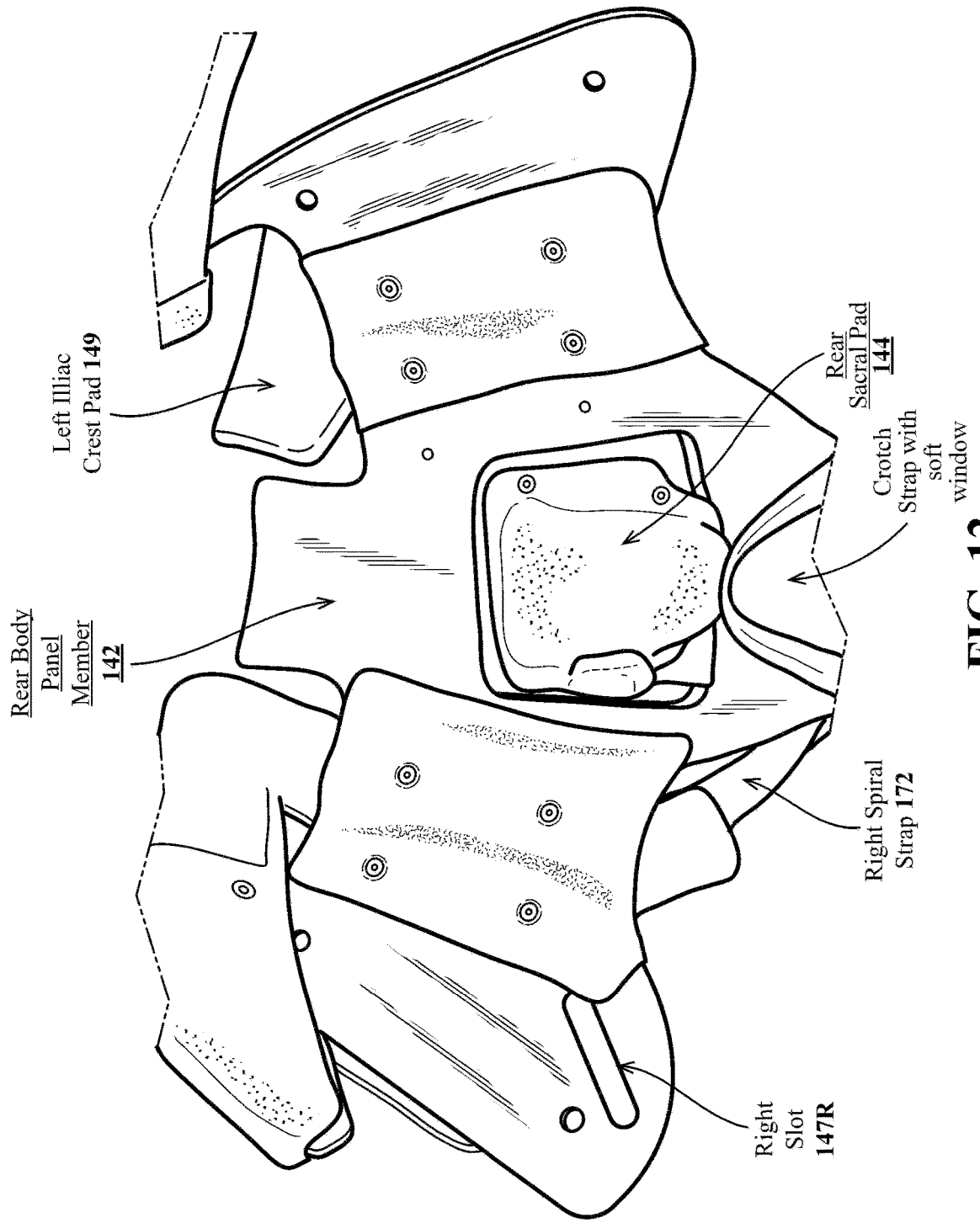
FIG. 12 shows various parts of the second embodiment brace assembly 100.

FIG. 12 shows various parts of the second embodiment brace assembly 100.

Figure 13:
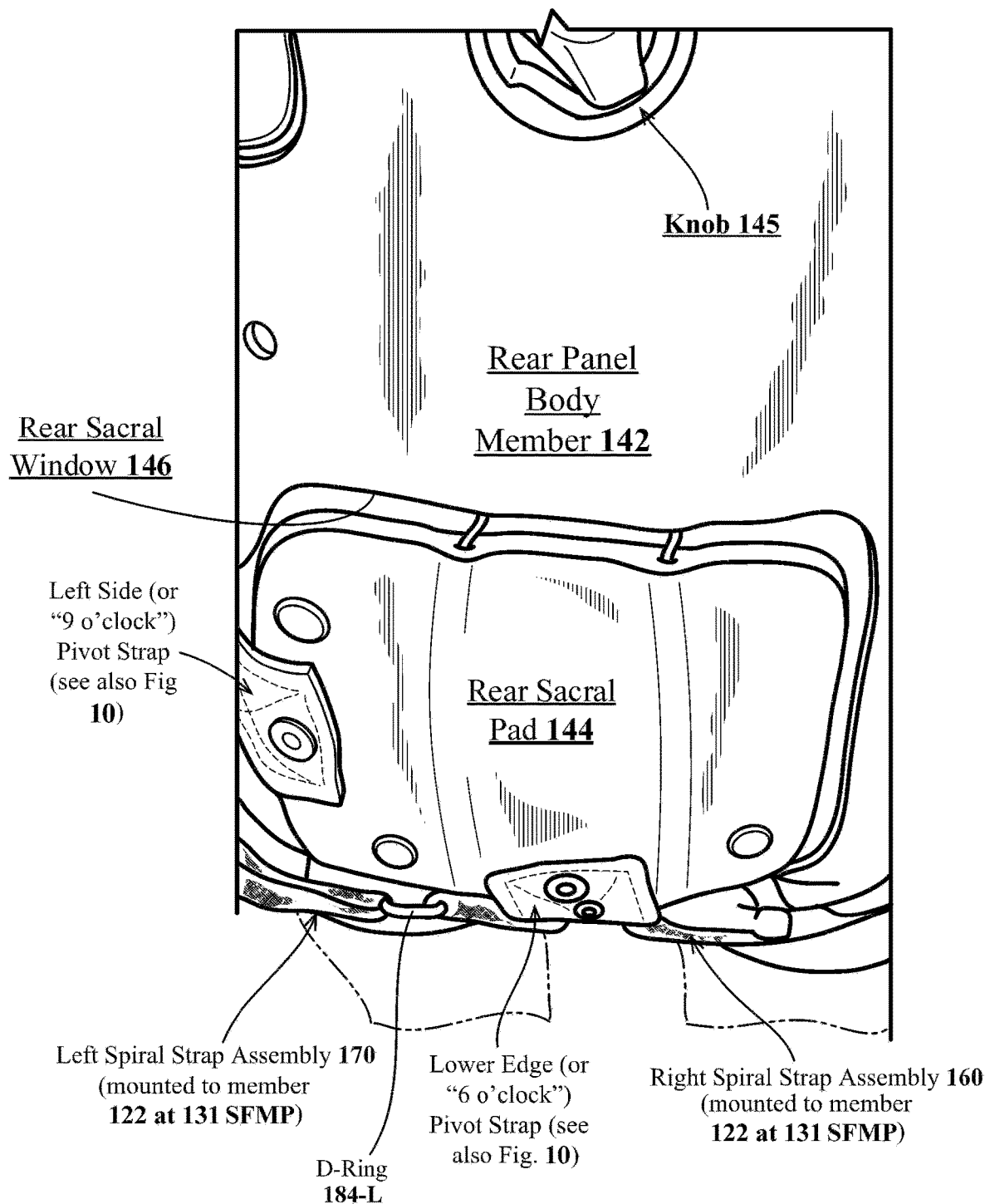
FIG. 13 shows a part of the rear panel body member 142, including the rear sacral pad 144, the adjustment knob 145, and the left and right spiral strap assemblies 170, 160, each of which is attached at their lower ends to the rear body panel member 142.

FIG. 13 shows a part of the rear panel body member 142, including the rear sacral pad 144, the adjustment knob 145, and the left and right spiral strap assemblies 170, 160, each of which is attached at their lower ends to the rear body panel member 142. Note that in this figure it may be seen that left and right D-rings 184 L, R, are included (the right one is not numbered), each of which attach (by rivets or other means) to the crotch strap and each of which attaches to a corresponding lower end of one of the spiral straps. The left one of these is also referenced as left strap rear mounting end location 168 in FIG. 11.

FIG. 13 shows parts of the front panel assembly 120.

Figure 14:
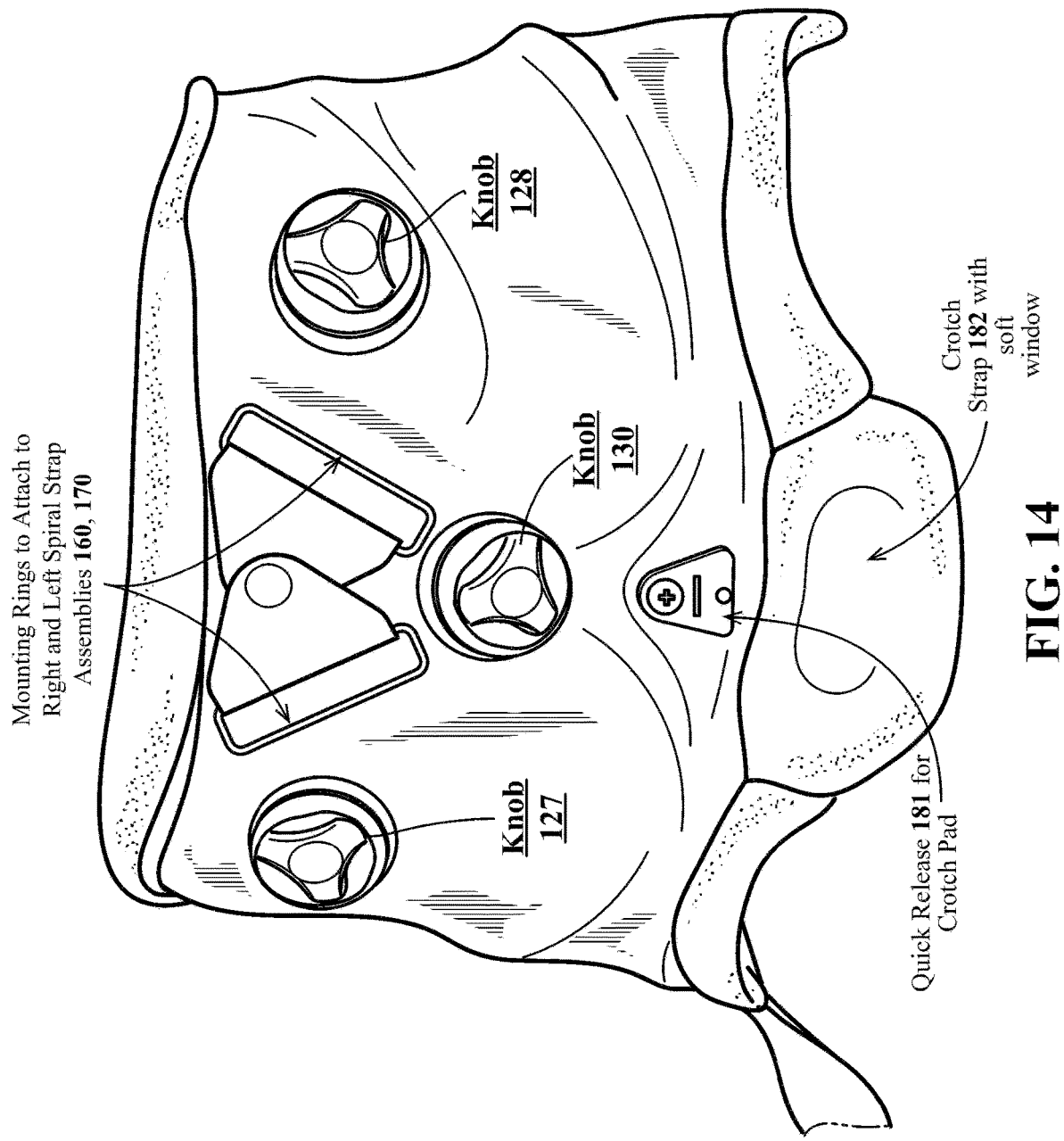
FIG. 14 shows parts of the rear panel assembly 140.
Figure 16:
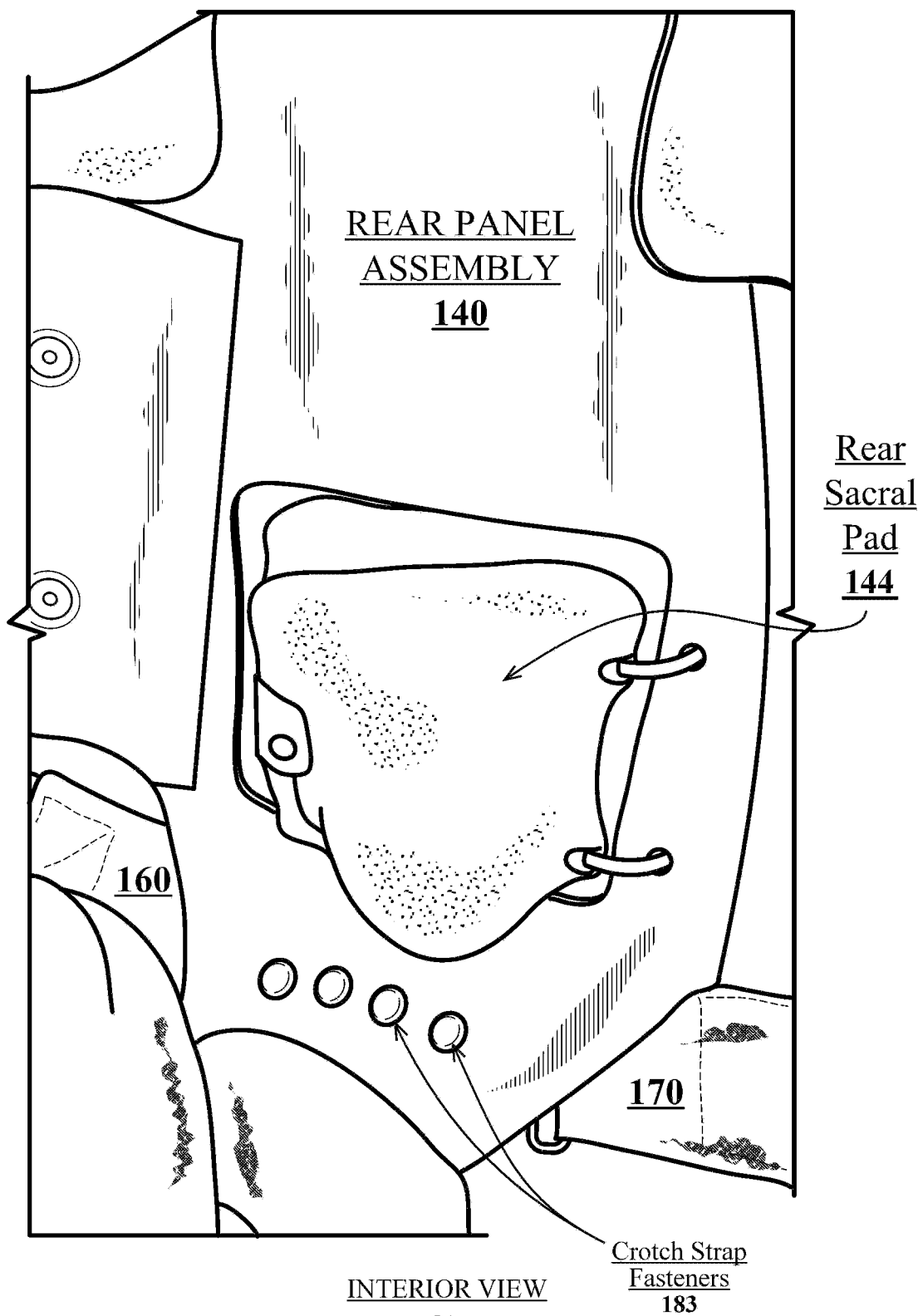
FIG. 16 is an interior view of a portion of a rear panel assembly.

FIG. 14 shows parts of the rear panel assembly 140. FIG. 14 shows a crotch strap 182 with a soft window. Also shown is a quick release 181 to allow quick detachment of the front end of the crotch strap. The rear end of the crotch strap 182 is attached to the rear clamshell portion by rivets or other suitable fasteners 183 as shown in FIG. 16.

Figure 15:
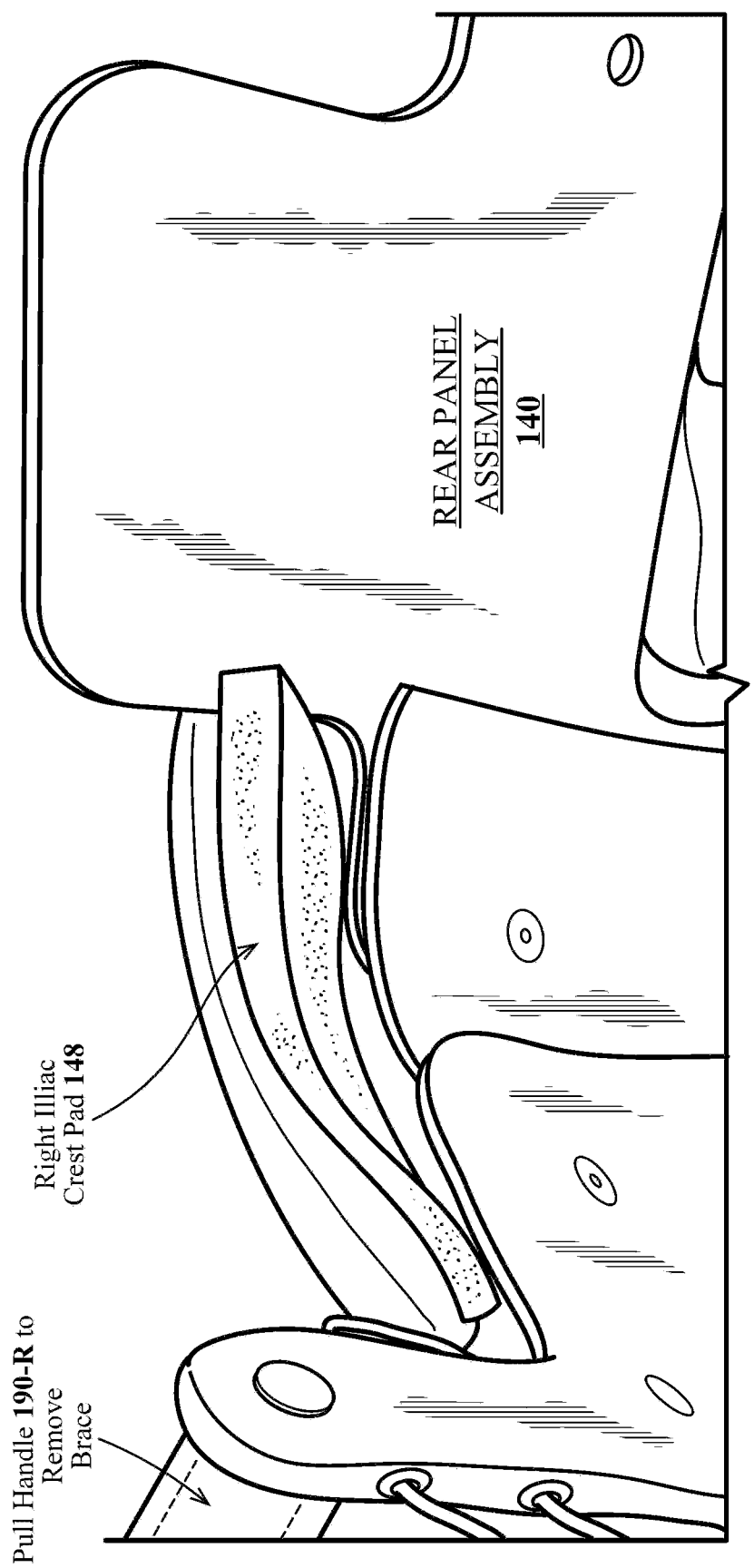
FIG. 15 shows parts of the rear panel assembly 140. Note that a right pull up loop 190R is shown, which allows the user to better handle the brace especially when putting on and off.

FIG. 15 shows parts of the rear panel assembly 140.

The Front Panel Assembly

The front panel assembly 120 includes the following elements:

Front panel body member 122
Right Iliac Crest Pad Adjustment Knob 127
Left Iliac Crest Pad Adjustment Knob 128
Side Gaps Adjustment Knob 130

The front panel body member 122 is semi-rigid, and made of flexible Fiberglas or the like.

The right iliac crest pad adjustment knob 127 is rotatably mounted relative to member 122, and its rotation adjusts the pressure of the right iliac crest pad 148 against the user's body, and in a similar manner the left iliac crest pad adjustment knob 128 adjusts the tension of left iliac crest pad 149 against the user's body.

In each case the pressure is intended to push against the respective iliac crest. In each case rotation of the knobs 127, 128, cause tension in corresponding right and left iliac crest pad tension wires 148-TW, 149-TW, which run through suitable channels in the front panel body member 122, the rear panel body member 142, as well as the crest pads 148, 149. The channels are located and positioned such that rotational adjustment of the knobs 127, 128 in a certain manner provides an increase of wire tension, thus pushing on the pads 148, 149, and providing an increase of pressure against the respective iliac crest.

The iliac crest pads push the iliac crests anteriorly and can also move the ilia in an anterior rotation. As may be seen in FIG. 10, each of the iliac crest pads fits within an open-sided window 149W in and defined by the rear panel member 142, in this case an open-sided window, with the open side directed upwardly. This enables each iliac crest pad to be independently adjustable in position relative to the rear panel body member.

The side gaps adjustment knob 130 is rotatably mounted relative to member 122, and its rotation adjusts the size of the side gaps between the front panel body member 122 and the rear panel body member 142. A left side gap is shown in FIG. 11. As may be understood, once the body members are in contact with the user's body, reduction of the side gaps tightens the front panel body member 122 and the rear panel body member 142 against the wearer's body. Similar to other knob/wire configurations herein, the knob 130 is attached to embedded wires which connect the two panel body members, such that rotation of the knob increases wire tension and pulls the members together.

The Rear Panel Assembly

The rear panel assembly 140 includes the following elements:
Rear Panel Body Member 142
Rear Sacral Pad 144
Rear Sacral Pad Adjustment Knob 145
Rear Sacral Pad Adjustment Knob Tension Wire 145-TW
Rear Sacral Window 146
147R, 147L Right and Left Slots
148 Right Iliac Crest Pad
148 TW Right Iliac Crest Pad Tension Wire
149 Left Iliac Crest Pad
149 TW Left Iliac Crest Pad Tension Wire The rear panel body member 142 is semi-rigid, and made of flexible Fiberglas or the like. FIG. 10 shows a rear panel assembly 140 of the second embodiment brace assembly 100, including a rear panel body member 142, a rear sacral pad 144, rear sacral pad adjustment knob 145, rear sacral pad adjustment knob tension wire 145-TW, right iliac crest pad 148, right iliac crest pad tension wire 148-TW, left iliac crest pad 149, and left iliac crest pad tension wire 149-TW. The rear sacral pad 144 fits within the rear sacral window 146 which is a closed window opening extending through the rear body panel member. Two sacral pad straps 144S are shown attaching the pad 144 relative to the body member 142. As noted earlier, rear sacral pad 144 includes a semi-rigid rectangular portion on the outside and a softer part (in dashes in FIG. 10) on the inside for pushing on the body. The tension wire is in and pushes on the rectangular portion.

The rear sacral pad adjustment knob 145 is rotatably mounted relative to member 142, and its rotation adjusts the pressure of the rear sacral pad assembly 144 against the body of the wearer. Note that if desired, at least one "pivot strap" (see e.g., 144S in FIG. 10) can be positioned to connect the rear sacral pad 144 relative to the base of the garment to provide a pivoting action so as to so that the force is directed toward a certain direction.

In the case shown in FIG. 10, which includes two straps 144S (at the 6 and 9 o'clock position) this pushes the upper right quadrant of the sacrum anteriorly superiorly and left rotation, as well as left lower quadrant anterior superior and rotating right. It should be understood that these straps 144S connecting the sacral pad 144 to the rear panel body member 142 can be varied in number and position so as to customize the patient's needs.

Another possible configuration includes straps at 9 o clock, 6 o clock and 3 o clock, which would neutralize sacral rotation and sacral side bending and promotes sacral counternutation.

Rotation of the knob 145 causes tension in the rear sacral pad adjustment knob tension wire 145-TW, which runs through suitable channels in the rear panel body member 142 (as well as the sacral pad). The channels are located and positioned such that rotational adjustment of the knob in a certain manner provides an increase of wire tension, thus pushing on the pad 144 and providing an increase of pressure of the rear sacral pad 144 against the sacral area of the body of the wearer.

The Spiral Straps

The brace assembly 100 also includes left and right spiral strap assemblies for use in combination with the front and rear panel assemblies 120, 140.

The right spiral strap assembly 120 includes the following:
Right Strap 162
Right Ischial Strap Pad 164
Right Strap Front Mounting End 166
Right Strap Rear Mounting End Location 168

The Left Spiral Strap Assembly 170 includes the following:
Left Strap 172
Left Ischial Strap Pad 174
Left Strap Front Mounting End 176
Left Strap Rear Mounting End Location 178

The spiral strap assemblies each extend from a mounting point on the front panel assembly 120, around the respective side of the wearer, to a lower mounting point on the rear panel assembly 140.

The right spiral strap assembly 160 spans from the front of the front panel assembly 120 (attached at the straps front mounting point SFMP—see FIG. 8), to the rear of the rear panel assembly 140 (attached at the right strap rear mounting end location 178 (see FIG. 9).

The left spiral strap assembly 170 spans from the front of the front panel assembly 120 (attached at the straps front mounting point SFMP—see FIG. 9), to the rear of the rear panel assembly 140 (attached at the right strap rear mounting end location 178 (see FIG. 10).

Referring now to FIG. 11, it may be seen how the left spiral strap 172 extends around the left side of the wearer, through a guiding slot 147 defined by the rear panel assembly 140, through and supporting a left ischial strap pad 174, to be finally affixed at the end location 168. In this case it may be understood that the left ischial strap pad 174 provides medial pressure on the left ischium, which provides adduction. Alternately, it can stabilize rotation of the ilia.

Configuration of the left spiral strap assembly 170 is similar to that of the right spiral strap assembly 160.

The knobs such as 127, 128, 130, 145 can be such as those known under the trademark "BOA".

To void with the device on, the user's central neoprene covered webbing crotch strap connecting the front and back shells is loosened and released by a quick release mechanism. To remove the brace, the user further releases all the knobs and the sacral (spiral) straps. The crotch strap can be tightened as needed when reinstalled.

Note that the tension wire could be metal, plastic, cotton, braided mason line, or any suitable material. Another word that could be used is "cord", or "line".

Note that in FIG. 15 shows parts of the rear panel assembly 140, including a right pull up loop (aka pull handle) 190R (a left loop is similar but not shown). Such straps are included as needed to allow the user to better handle the brace especially when putting on and off.

Reference is now made generally to FIGS. 17A-18, and FIG. 19, which relate to a brace assembly 300.

Figure 17A:
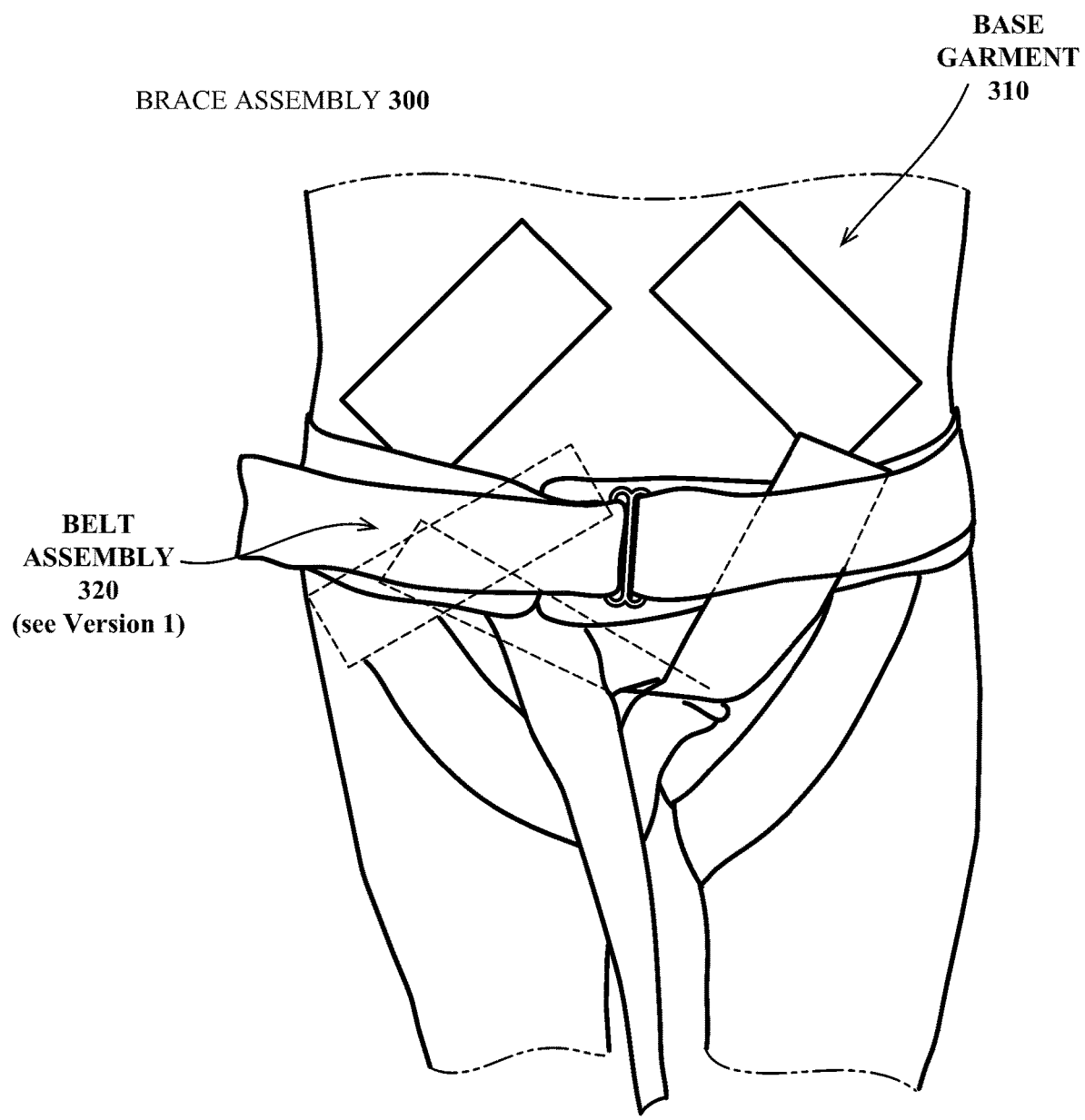
FIG. 17A is a front view of brace assembly 300, including a base garment 310 to which multiple straps are attached, and also including a belt assembly 320. Note that the belt assembly 320 is the same as the assembly 10 of FIG. 1. It should be understood that "dotted" lines are generally indicating hidden features, such as straps on the opposite side of the body relative to the viewer.

FIG. 17A is a front view of brace assembly 300, including a base garment 310 to which multiple straps are attached, and also including a belt assembly 320. Note that the belt assembly 320 is the same as the assembly 10 of FIG. 1. It should be understood that "dotted" lines are generally indicating hidden features, such as straps on the opposite side of the body relative to the viewer.

Figure 17B:
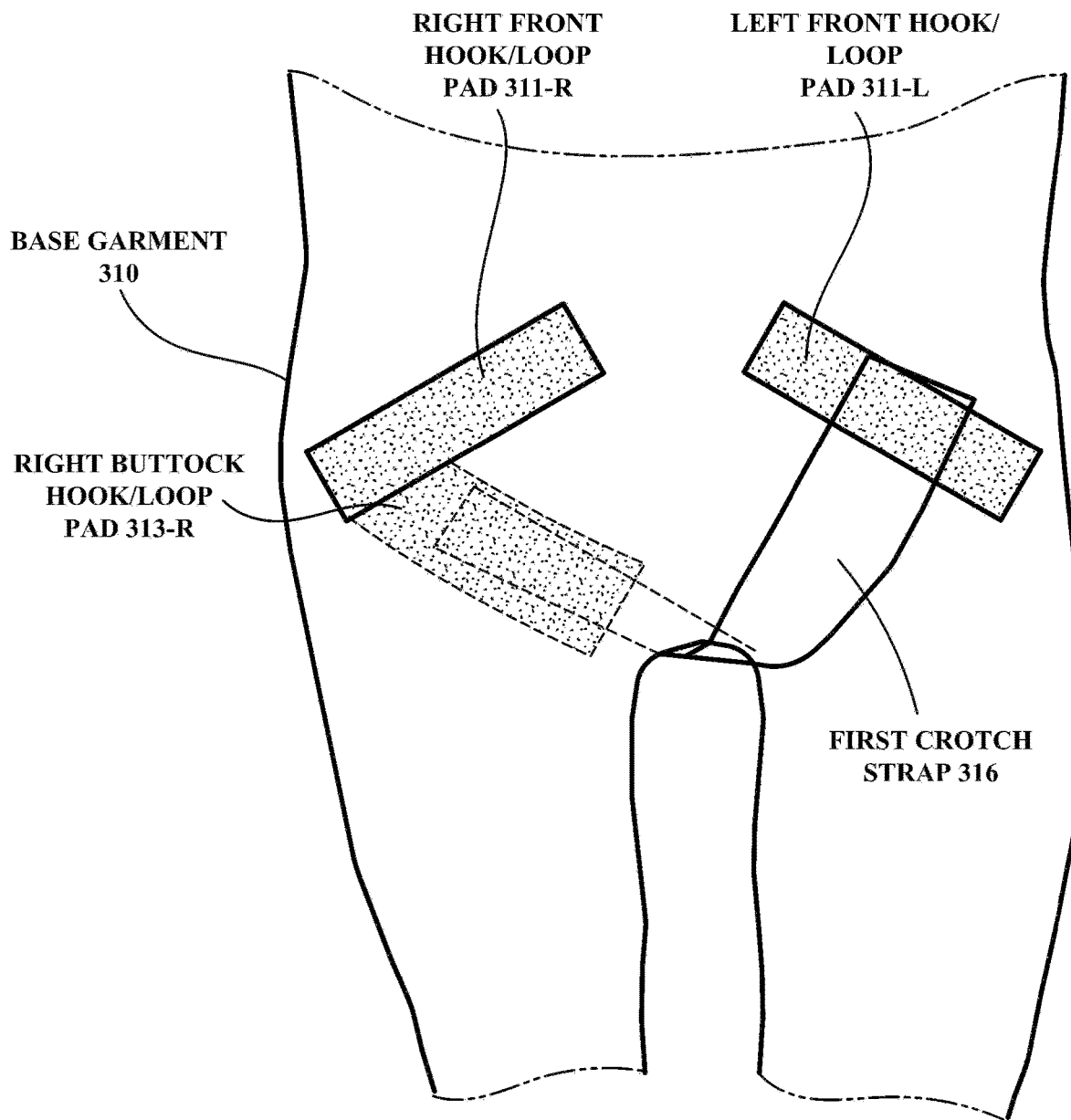
FIG. 17B is similar to FIG. 17A, except that the belt and other elements have been removed. Shown are the base garment 310, right and left front hook-loop pads 311-R, 311-L, respectively, and a first crotch strap 316.

FIG. 17B is similar to FIG. 17A, except that the belt and other elements have been removed. Shown are the base garment 310, right and left front hook-loop pads 311-R, 311-L, respectively, and a first crotch strap 316.

Figure 17C:
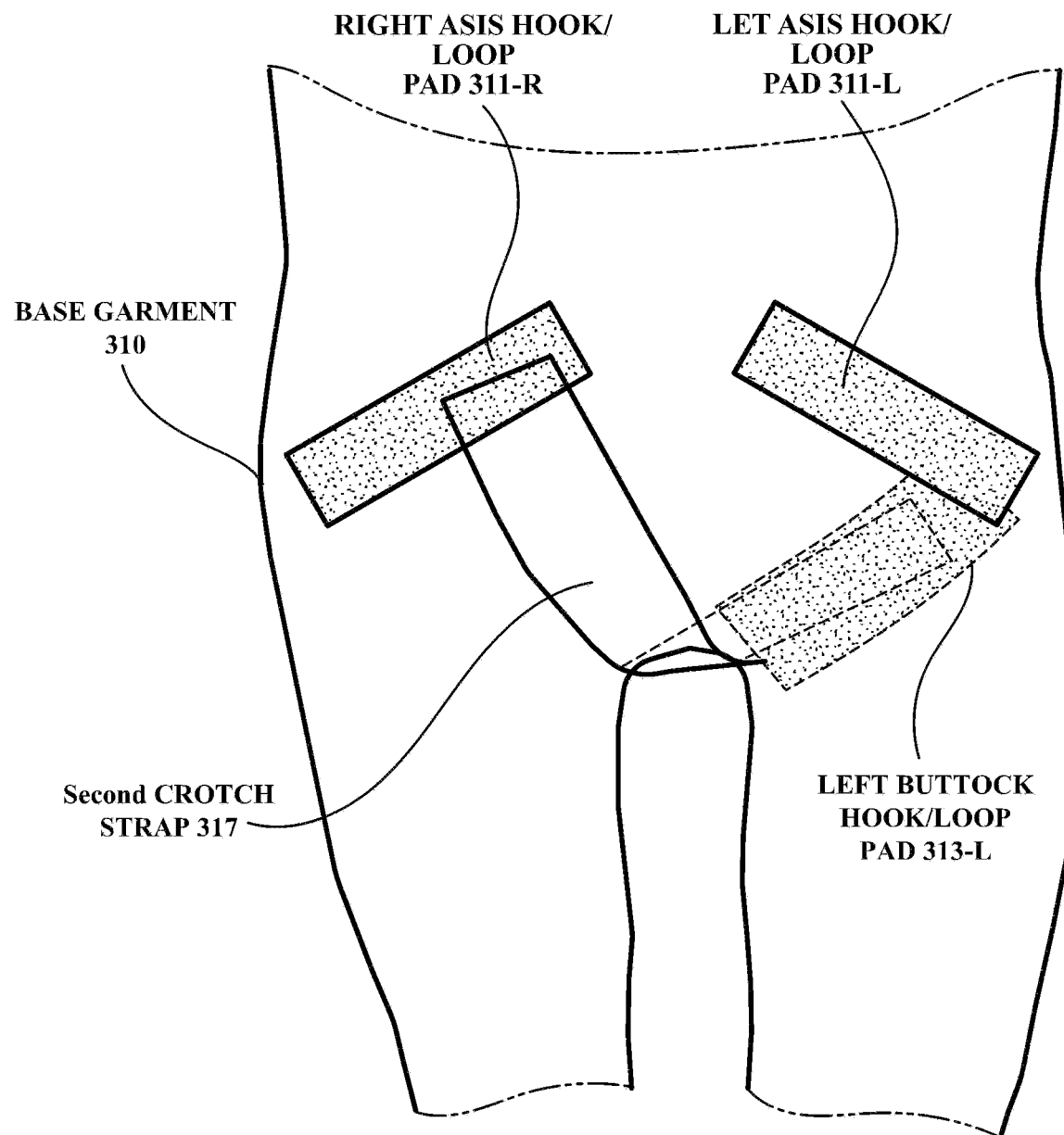
FIG. 17C is similar to FIG. 17B, except that first crotch strap is not shown. Shown are the base garment 310, right and left front hook-loop pads 311-R, 311-L, respectively, and a second crotch strap 317.

FIG. 17C is similar to FIG. 17B, except that first crotch strap is not shown. Shown are the base garment 310, right and left front hook-loop pads 311-R, 311-L, respectively, and a second crotch strap 317.

Figure 17D:
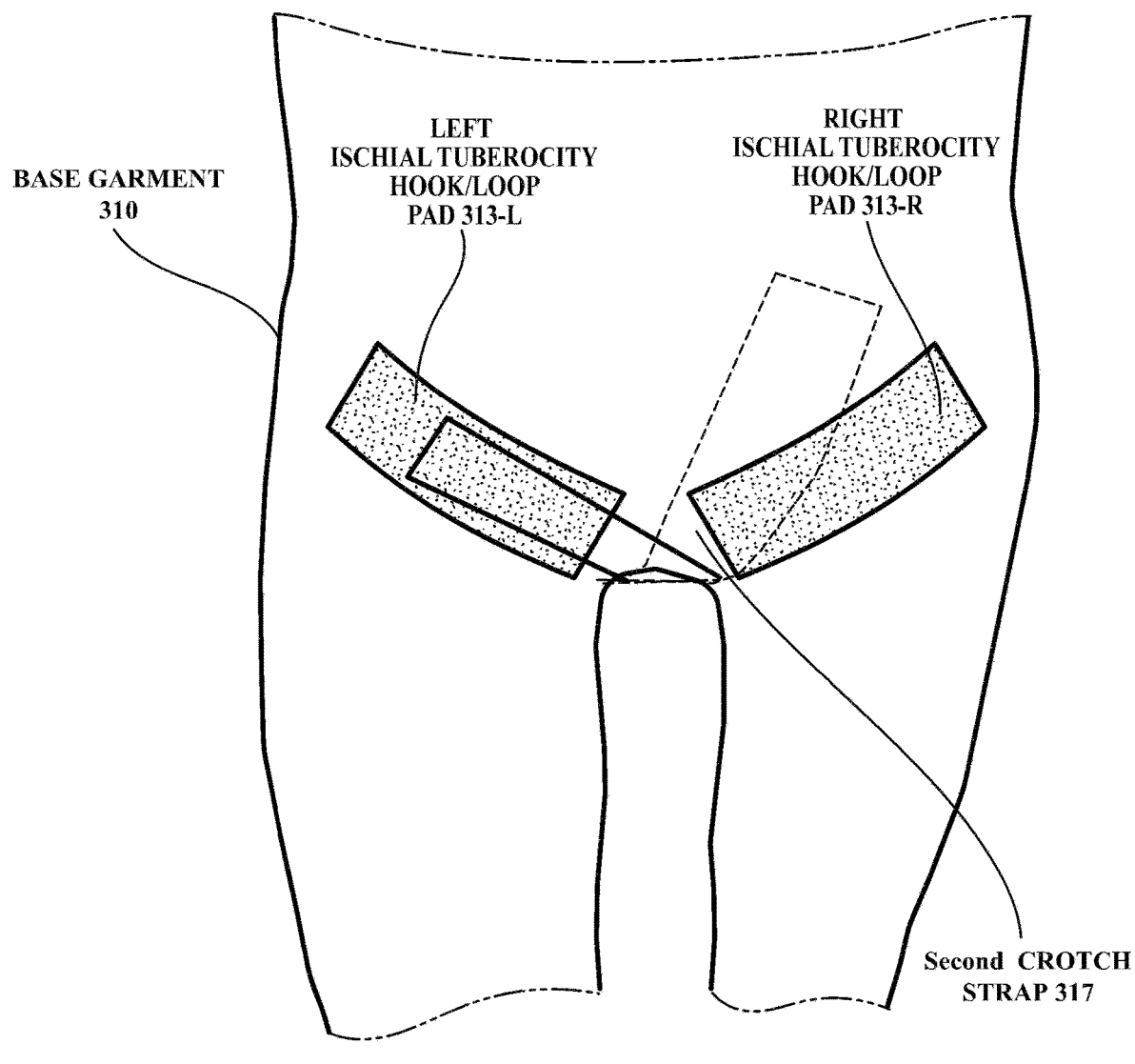
FIG. 17D is generally similar to FIG. 17C, except that the view is from the rear of the user, as opposed to the front of the user. This shows left and right buttock hook-loop pads 313-L, 313-R, respectively, which are configured to attach to the crotch straps as noted elsewhere, and are located generally atop the respective buttock region.

FIG. 17D is generally similar to FIG. 17C, except that the view is from the rear of the user, as opposed to the front of the user. This shows left and right buttock hook-loop pads 313-L, 313-R, respectively, which are configured to attach to the crotch straps as noted elsewhere, and are located generally atop the respective buttock region.

Figure 18:
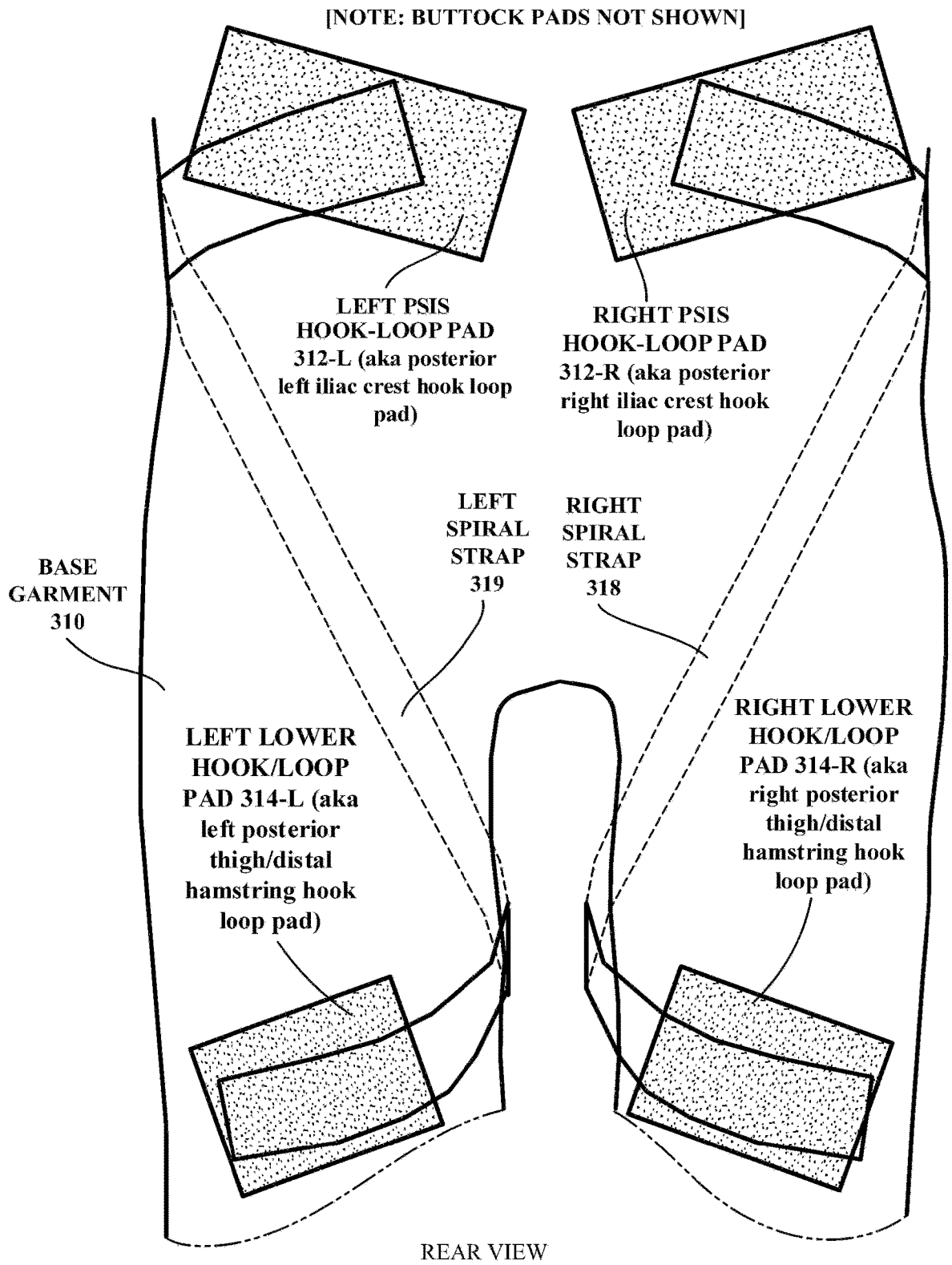
FIG. 18 shows the base garment 310 as used with spiral straps, as compared to the crotch straps shown above. These spiral straps could be used separately from or in conjunction with the crotch straps. Note that in this figure the buttock pads are not shown for clarity. Shown are an outline of the base garment 310, as well as left and right upper back hook-loop pads 312-L, 312-R, respectively, as well as left and right lower back hook-loop pads 314-L, 314-R, respectively, as well as left and right spiral straps 319, 318, respectively.

FIG. 18 shows the base garment 310 as used with spiral straps, as compared to the crotch straps shown above. These spiral straps could be used separately from or in conjunction with the crotch straps. Note that in this figure the buttock pads are not shown for clarity. Shown are an outline of the base garment 310, as well as left and right upper back hook-loop pads 312-L, 312-R, respectively, as well as left and right lower back hook-loop pads 314-L, 314-R, respectively, as well as left and right spiral straps 319, 318, respectively.

The following elements are attached to the outer surface of the base garment:
  left front (aka ASIS) hook-loop pad 311-L
  right front (aka ASIS) hook-loop pad 311-R
  left upper back (aka PSIS and post iliac crest) hook-loop pad 312-L
  right upper back (aka PSIS and post iliac crest) hook-loop pad 312-R
  left buttock (aka ischial tuberosity) hook-loop pad 313-L
  right buttock (aka ischial tuberosity) hook-loop pad 313-R
  left lower back (aka posterior distal thigh hamstring) hook-loop pad 314-L
  right lower back (aka posterior distal thigh hamstring) hook-loop pad 314-R "ASIS" means anterior superior iliac spine, and "PSIS" means posterior superior iliac spine.

The following elements are separate from base garment 310 and are configured to provide pulling forces along the length of the straps, as well as to provide sideward lateral forces transverse to the longitudinal axis of the elongate straps (a pushing action against the body). These straps include:
  First Crotch Strap 316
  Second Crotch Strap 317
  Right Spiral Strap 318
  Left Spiral Strap 319
  Construction and Operation
  The Base Garment 310

The base garment 310 is in one configuration a conventional "shorty" wetsuit with sleeves removed, so as to includes strap support over the shoulders. This allows it to provide support for the garment to prevent it from going downward.

One preferred thickness is 3-7 mil.

On the inside of the base are provided at various locations non-slip surfaces, in order to encourage gripping of the body at these locations. These non-slip surfaces are in one configuration underneath one or all of the various hook-loop pads.

The Crotch Straps 316, 317

The function of the crotch straps 316, 317 are to anteriorly rotate the ilia and adduct the ischial tuberosities.

As shown in FIG. 17B, the first crotch strap 316 is elongate, and extends from its "front" end proximate the left front of the wearer, through the crotch, and across the body such that its "rear" end is proximate the right buttock of the wearer. More specifically, at the front, the crotch strap attaches proximate the iliac crest and ASIS anterior superior spine. At the rear, the crotch strap attaches proximate a location inferior and lateral to the ischial tuberosity.

At each end of the first crotch strap 316 is a suitable hook-loop configuration which is configured to engage another suitable hook-loop configuration of one of the hook loop pads attached to the base garment 310. As shown in FIG. 16B, the "front" end of the first crotch strap 316 is configured to be detachably connected to the left front hook/loop pad 311-L. As shown in FIG. 17C, the "front" end of the second crotch strap 317 is configured to be detachably connected to the right front hook/loop pad 311-R.

Reference is now also made to FIG. 17D, which is generally similar to FIG. 17C, except that the view is from the rear of the user, as opposed to the front of the user. This shows left and right buttock hook-loop pads 313-L, 313-R, respectively. This drawing also shows the "rear" end of the second crotch strap 317 as it is configured to be detachably connected to the left buttock hook/loop pad 313-L. Although not shown, this is the same manner in which the "rear" end of the first crotch strap 316 is detachably connected to the right buttock hook/loop pad 313-R.

The Spiral Straps 318, 319

Referring now to FIG. 18 shown are an outline of the base garment 310, as well as left and right upper back hook-loop pads 312-L, 312-R, respectively, as well as left and right lower back hook-loop pads 314-L, 314-R, respectively, as well as left and right spiral straps 319, 318, respectively. Note that in this figure the buttock pads are not shown for clarity.

As may be seen the two spiral straps 319, 318, respectively are attached at their upper ends to the left and right upper back hook-loop pads 312L, 312R, respectively. The two spiral straps 319, 318, respectively are attached at their lower ends to the left and right lower back hook-loop pads 314L, 314R, respectively. Tension is set as needed.

The idea of the spiral straps is as follows. As the foot advances during gait, the straps cause the user to experience an anterior rotation force of the ilia, as opposed to a posterior rotation force as is normally encountered.

As shown in FIG. 18, a spiral strap stays to one side of the sagittal plane. It attaches at one end to an upper location, and at the other end to a lower location.

The spiral path begins at the upper location being on the rear of the garment and proximate the medial and posterior iliac crest, and to said one side of the sagittal plane.

The spiral path continues from the upper location and extends away from the sagittal plane, forward through the frontal plane, and around the body of the user to the front of the user as it also continues downward.

The spiral path continues to spiral as it passes below the groin area and against the inside of the thigh and again through the frontal plane.

The spiral path terminates at the lower location being on the rear of the garment and behind the thigh at a location inferior to the hamstring muscle belly.

The crotch straps could be used without the spiral straps, and vice versa.

Additionally, one spiral strap could be used and not the other, and one cross strap could be used and not the other. The spiral straps are made of 4 layers of 2" wide elastic.

Figure 20:
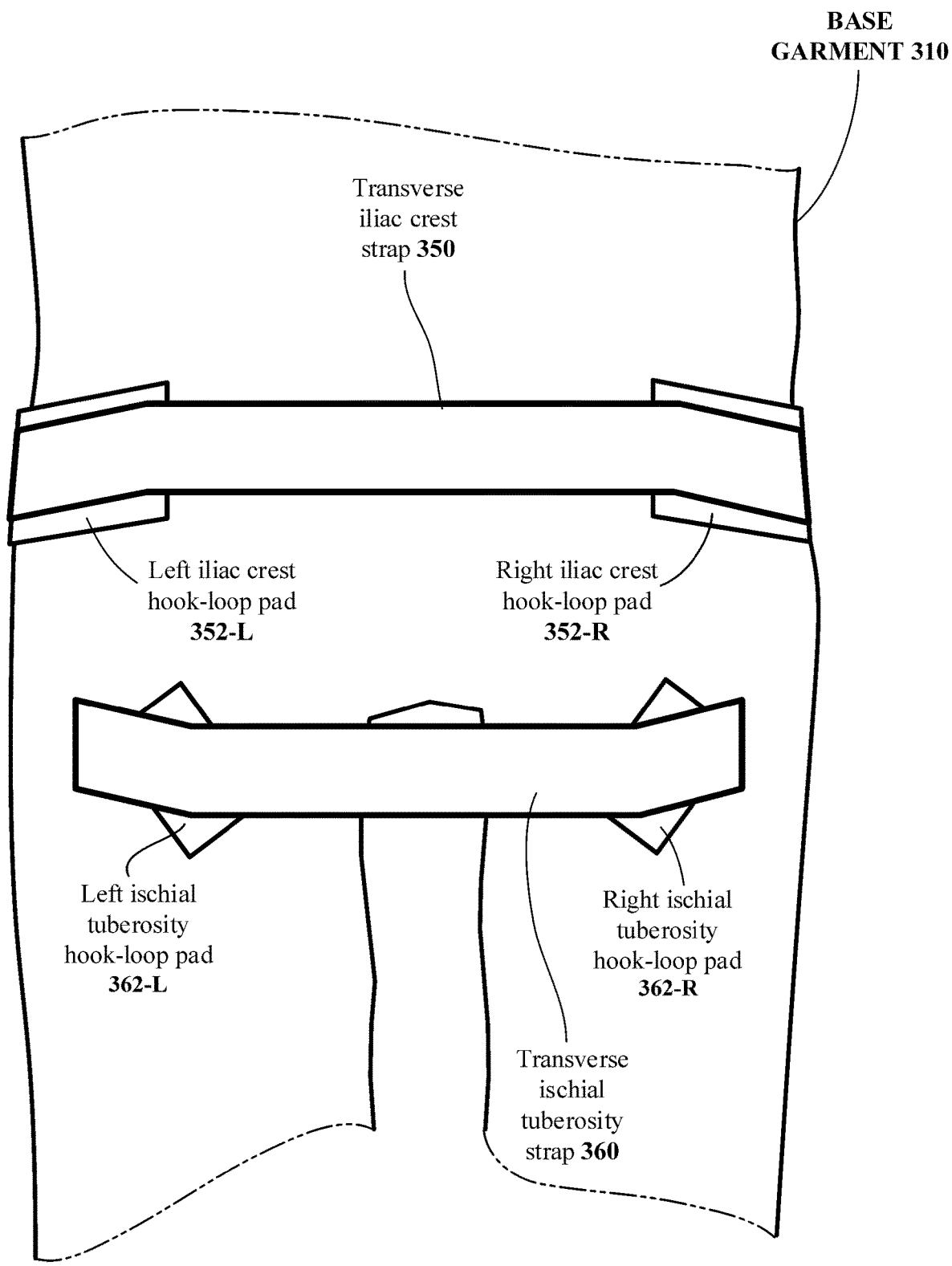
FIG. 20 shows the base garment 310 as used with transverse straps, one being a transverse iliac crest strap 350 and the other being a transverse ischial tuberosity strap 360.

FIG. 20 shows the base garment 310 as used with transverse straps, one being a transverse iliac crest strap 350 and the other being a transverse ischial tuberosity strap 360.

The transverse iliac crest strap 350 is elongate and has two ends (left and right) configured to engage left and right anterior and lateral iliac crest hook-loop pads 352-L, 352-R. The left and right anterior and lateral iliac crest hook-loop pads 352-L, 352-R are generally atop a corresponding anterolateral to lateral iliac crest region. Tension in the transverse iliac crest strap 350 tends to pull the left and right iliac ischial crests to the midline.

The transverse ischial tuberosity strap 360 is elongate and has two ends (left and right) configured to engage left and right ischial tuberosity hook-loop pads 362-L, 362-R, respectively, each of which are located generally atop locations lateral to the corresponding left and right ischial tuberosities. Tension in the transverse ischial tuberosity strap 360 tends to pull the left and right ischial tuberosities to the midline.

Note that all straps in the configuration may have their ends attached to the Velcro pads on the wetsuit, or alternatively there could be Velcro pads attached to the wetsuit which include elongate rings through which the ends of the straps may pass through and then attach back on themselves. This allows for adjustment of the position of the Velcro pads/rings, as well as adjustment of the tightness of the straps without removing the pads.

Note that a silicone coupling agent or other suitable material could be used on the inside of the garment behind the hook and loop patches in order to enhance grip.

Belt assembly 320

The belt assembly 320 is similar to that shown earlier as 10 in FIG. 1.

Variations

Note that any of the braces could be incorporated into military applications in which they could be part of internal lining or externally affixed to combat uniforms.

Note that the Velcro strap(s) could be or in combination with poly-pro or other suitable strapping or webbing.

Conclusion

Various modifications and variations can be made in the present invention without departing from the spirit or scope of the invention.

From the foregoing, it will be seen that this invention is one well adapted to obtain all the ends and objects herein set forth, together with other advantages which are obvious and which are inherent to the structure.

It will be understood that certain features and sub combinations are of utility and may be employed without reference to other features and sub combinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A pelvic brace assembly for use by a user to provide a bracing function, comprising:
a belt for encircling the body of a user proximate the waist area;
a front pubic pad configured to be attached relative to said belt proximate the anterior side of the user's body and at the midline of said body such that said pubic pad is in proximal contact with said pubic symphysis joint of said user and provides a bracing function proximate said symphysis joint of said user; and
a rear sacral pad configured to be attached relative to said belt proximate the posterior side and at the midline of said user's body such that said sacral pad is in contact with said user and provides a bracing function,
said front pubic pad and said rear sacral pad being relatively attached proximate the groin area.

2. The brace as claimed in claim 1, wherein said belt is positioned approximately in midline of sacrum in the frontal plane and midline of sacrum in the transverse plane.

3. The brace as claimed in claim 1, wherein said front pubic pad and said rear sacral pad are relatively attached proximate the groin area by an intermediate strap, said strap being adjustable so as to allow adjustment between the relative locations of said front pubic pad and said rear sacral pad.

4. The brace as claimed in claim 1, wherein circumferential tension about the belt line pulls both ilia towards the sacrum, and pushes the sacral pad anteriorly and the public pad posteriorly.

5. The brace as claimed in claim 1, wherein said belt comprises:
a left strap assembly having first and second ends, said first end of said left strap assembly attached relative to said rear sacral pad, and
a right strap assembly having first and second ends, said first end of said right strap assembly attached relative to said rear sacral pad, and said second end of said right strap assembly attached to said second end of said left strap assembly, such that said belt is a result of said left and right strap assemblies and extends around said user with the free ends of said belt both being attached to said rear sacral pad,
said right strap assembly being independently adjustable in length,
said left strap assembly being independently adjustable in length,
such that said left strap assembly and said right strap assembly may be independently adjustable so as to allow said front public and rear sacral pads to be adjusted in their positions on said user, thus facilitating anterior rotation of the ilia.

6. A pelvic brace assembly for use by a user to provide a bracing function, comprising:
a belt for encircling the body of a user proximate the waist area;
a front pubic pad configured to be attached relative to said belt proximate the anterior side of the user's body and at the midline of said body such that said pubic pad is in proximal contact with said pubic symphysis joint of said user and provides a bracing function proximate said symphysis joint of said user; and
a rear sacral pad configured to be attached relative to said belt transversely proximate the posterior side and at the midline of said user's body longitudinally and transversely such that said sacral pad is in contact with said user and provides a bracing function,
said front pubic pad and said rear sacral pad being relatively attached proximate the groin area,
said front pubic pad being attached to said belt by a front loop member attached to said front pubic pad, said front loop member looping around said belt such that said loop may be moved along the length of said belt for adjustment purposes of said front pubic pad while still providing an attachment between said loop and said front pubic pad.

7. The brace as claimed in claim 6, wherein said belt comprises:
   a left strap assembly having first and second ends, said first end of said left strap assembly attached relative to said rear sacral pad, and
   a right strap assembly having first and second ends, said first end of said right strap assembly attached relative to said rear sacral pad, and said second end of said right strap assembly attached to said second end of said left strap assembly, such that said belt is a result of said left and right strap assemblies and extends around said user with the free ends of said belt both being attached to said rear sacral pad,
   said right strap assembly being independently adjustable in length,
   said left strap assembly being independently adjustable in length,
   such that said left strap assembly and said right strap assembly may be independently adjustable so as to allow said front public and rear sacral pads to be adjusted in their positions on said user.

8. A pelvic brace assembly for use by a user to provide a bracing function, comprising:
   a base elastic garment having an interior surface having a preselected level of gripping relative to said user's skin; and
   at least one strap configured to be attached relative to said base garment, such that tension in said strap provides said bracing function in the form of pulling of one bony protuberance towards another,
   wherein said strap is a transverse ischial tuberosity strap configured to pull the left and right ischial tuberosities of a user towards the midline of the body, said transverse ischial tuberosity strap having ends proximate locations generally lateral to the corresponding left and right ischial tuberosities of the user.

9. A pelvic brace assembly for use by a user to provide a bracing function, comprising:
   a pair of elastic gripping portions each having an interior surface having a preselected level of gripping relative to said user's skin; and
   at least one strap having opposing ends, each of said opposing ends configured to be attached relative to a respective one of said gripping portions, such that tension in said strap provides said bracing function in the form of pulling of one bony protuberance towards another,
   wherein said strap is a transverse ischial tuberosity strap configured to pull the left and right ischial tuberosities of a user towards the midline of the body, said transverse ischial tuberosity strap having ends attached to a corresponding one of said gripping portions attached proximate corresponding locations generally lateral to the corresponding left and right ischial tuberosities of the user.

10. A pelvic brace assembly for use by a user to provide a bracing function, comprising:
    a pair of elastic gripping portions each having an interior surface having a preselected level of gripping relative to said user's skin; and
    at least one crotch strap having opposing ends, each of said opposing ends configured to be attached relative to a respective one of said gripping portions, such that tension in said strap provides said bracing function in the form of pulling of one bony protuberance towards another,
    wherein said strap is a crotch strap, to anteriorly rotate the ilia and adduct the ischial tuberosities, and
    wherein said crotch strap extends from its "front" end attached to a respective one of said gripping portions attached proximate the left iliac crest and ASIS anterior superior spine of the user, through the crotch, and upward and across the body such that its "rear" end is attached to a respective other of said gripping portions attached proximate the right buttock of the user proximate a location inferior and lateral to the right ischial tuberosity,
    wherein said crotch strap extends from its "front" end attached to a respective one of said gripping portions attached proximate one iliac crest and ASIS anterior superior spine of the user, through the crotch, and upward and across the body such that its "rear" end is attached to a respective other of said gripping portions attached proximate the buttock of the user opposite said one iliac crest proximate a location inferior and lateral to the ischial tuberosity likewise opposite said one iliac crest.

11. A pelvic brace assembly for use by a user to provide a bracing function, comprising:
    a pair of elastic gripping portions each having an interior surface having a preselected level of gripping relative to said user's skin; and
    at least one strap, having opposing ends, each of said opposing ends configured to be attached relative to a respective one of said gripping portions, such that tension in said strap provides said bracing function in the form of pulling of one bony protuberance towards another,
    wherein said strap is a spiral strap configured such that as the foot advances during gait, the strap causes the user to experience an anterior rotation force of the ilia, as opposed to a posterior rotation force as is normally encountered.

12. A pelvic brace assembly for use by a user to provide a bracing function, comprising:
    a pair of elastic gripping portions each having an interior surface having a preselected level of gripping relative to said user's skin; and
    at least one strap having opposing ends, each of said opposing ends configured to be attached relative to a respective one of said gripping portions, such that tension in said strap provides said bracing function in the form of pulling of one bony protuberance towards another,
    wherein said strap is a spiral strap extending in a spiral path from an upper location to a lower location relative to said user, said spiral path staying on one side of the sagittal plane and being as follows:
    said spiral path beginning at the upper location being on the rear of said user and proximate the PSIS and posterior iliac crest, and to said one side of the sagittal plane,
    said spiral path continuing from said upper location and extending away from the sagittal plane, forward through the frontal plane, and around the body of the user to the front of the user as it also continues downward,
    said spiral path continuing to spiral as it passes below the groin area and against the inside of the thigh and again through the frontal plane, said spiral path terminating at the lower location being on the rear of said user and behind the thigh inferior to the hamstring muscle belly.

13. A pelvic brace assembly for use by a user to provide a bracing function, comprising:
   a pair of elastic gripping portions each having an interior surface having a preselected level of gripping relative to said user's skin; and
   at least one strap having opposing ends, each of said opposing ends configured to be attached relative to a respective one of said gripping portions, such that tension in said strap provides said bracing function in the form of pulling of one bony protuberance towards another,
   wherein said strap is a transverse iliac crest strap configured to pull the left and right iliac crests towards the midline of the body, said transverse iliac crest strap having ends attached to corresponding gripping portions attached proximate a corresponding anterolateral to lateral iliac crest region of the user.

\* \* \* \* \*